(12) United States Patent
Ruhman et al.

(10) Patent No.: US 11,638,501 B2
(45) Date of Patent: May 2, 2023

(54) PORTABLE CUTTING APPARATUS ELEVATION SYSTEM

(71) Applicant: PECOS USA, LLC, Austin, TX (US)

(72) Inventors: Brooks Ruhman, Austin, TX (US); Frederick Gowen Scheen, Austin, TX (US); Reid Smith Newnam, Chapel Hill, NC (US)

(73) Assignee: PECOS USA, LLC, Austin, TX (US)

( * ) Notice: Subject to any disclaimer, the term of this patent is extended or adjusted under 35 U.S.C. 154(b) by 0 days.

(21) Appl. No.: 17/409,720

(22) Filed: Aug. 23, 2021

(65) Prior Publication Data

US 2022/0322888 A1 Oct. 13, 2022

Related U.S. Application Data

(63) Continuation-in-part of application No. 17/224,335, filed on Apr. 7, 2021.

(51) Int. Cl.
*A47J 47/00* (2006.01)
*B26B 29/06* (2006.01)

(52) U.S. Cl.
CPC .......... *A47J 47/005* (2013.01); *B26B 29/063* (2013.01)

(58) Field of Classification Search
CPC .............................. A47J 47/005; B26B 29/063
See application file for complete search history.

(56) References Cited

U.S. PATENT DOCUMENTS 3,406,935 A 10/1968 Mutchnik et al.
3,625,162 A * 12/1971 Crew ...................... A47J 47/20
248/172
2004/0119221 A1 * 6/2004 Davis ..................... A47J 47/005
269/289 R
2013/0344303 A1 * 12/2013 Randall ................. B32B 27/308
427/407.1
2019/0320853 A1 * 10/2019 Scott ..................... A47J 47/005

FOREIGN PATENT DOCUMENTS

WO 2016098117 A1 6/2016

OTHER PUBLICATIONS

Non-Final Office Action, U.S. Appl. No. 17/224,335, dated Feb. 28, 2023, U.S. Patent and Trademark Office, 15 pages.

* cited by examiner

*Primary Examiner* — Nirvana Deonauth
(74) *Attorney, Agent, or Firm* — Jackson Walker L.L.P.

(57) ABSTRACT

A portable cutting apparatus is described. The portable cutting apparatus includes a cutting board having a top surface and a bottom surface. The bottom surface includes sockets configured to receive legs of an elevation system. Each socket is threaded to include an alignment component and teeth. The alignment component biases rotation of the elevation system component during insertion into the socket to enable full insertion. The teeth are configured to mesh with corresponding teeth of the leg and mechanically secure the leg within the socket. The leg is threaded opposite an end configured for insertion into the socket to include a table foot, in a manner that enables individual height adjustment for each leg of the elevation system. The table foot is configured with a hollow cavity that permits articulation of a base of the table foot to adapt to various surfaces when the portable cutting apparatus is deployed.

12 Claims, 16 Drawing Sheets

500 ⟶

502
Form a cutting board to include a cutting surface and a bottom surface that includes side walls disposed along opposite edges of the bottom surface.

↓

504
Form a storage cavity for storing an elevation system for the cutting board by attaching a first reinforcement plate to the side walls at a first end of the bottom surface of the cutting board and attaching a second reinforcement plate to the side walls at a second end of the bottom surface of the cutting board

↓

506
Store the elevation system for the cutting board within the storage cavity

1402
Form a cutting board to include a cutting surface and a bottom surface that includes side walls disposed along opposite edges of the bottom surface.

1404
Form a socket in the bottom surface that is configured to receive a leg of an elevation system for the cutting board by threading the socket to include an alignment element and at least one tooth

1406
Form the leg of an elevation system

1408
Thread a protrusion of the leg with an alignment element configured to glide along the alignment element of the socket and at least one tooth configured to mesh with the at least one tooth of the socket

1410
Thread a cavity of the leg opposite the protrusion to receive a table foot for the elevation system

1412
Deploy the elevation system by meshing the at least one tooth of the leg with the at least one tooth of the socket

FIG. 14

PORTABLE CUTTING APPARATUS ELEVATION SYSTEM

PRIORITY

This application is a continuation-in-part of, and claims priority to, U.S. patent application Ser. No. 17/224,335, filed on Apr. 7, 2021, the disclosure of which is hereby incorporated by reference in its entirety.

BACKGROUND

When engaged in outdoor activities, such as camping, boating, tailgating, barbequing, fishing, or hunting, users often need to find a sturdy surface to prepare food and drinks, filet fish, process game meat, and so forth. As these types of activities occur outdoors, however, it can be difficult to find such a surface that is portable and compact so that it can be easily taken into the outdoors, and yet is also durable enough to support such activities. For example, a conventional plastic table or card table would likely bend, break, or crack if used to butcher an elk, whereas a wooden or metal table is too heavy and bulky to be easily transported for outdoor activities. Further, outdoor terrain rarely offers a level plane for positioning such a surface, resulting in unsteady or unlevel surfaces that are unfit for their intended use.

SUMMARY

A portable cutting apparatus is described. The portable cutting apparatus includes a cutting board having a cutting surface and a bottom surface. The bottom surface of the cutting board includes side walls disposed along opposite edges of the bottom surface. The portable cutting apparatus further includes a first reinforcement plate attached to the side walls at a first end of the bottom surface and a second reinforcement plate attached to the side walls at a second end of the bottom surface. The first and second reinforcement plates are configured to provide reinforcement for an elevation system when the portable cutting apparatus is in an elevated state. The side walls and the first and second reinforcement plates form a storage cavity for storing the elevation system when the portable cutting apparatus is in a storage state.

The bottom surface includes one or more sockets that are configured to receive components (e.g., legs) of the elevation system. In some implementations, each socket is threaded to include an alignment component and teeth. The alignment component is configured to bias rotation of the elevation system component during insertion into the socket to a position that enables full insertion of the elevation system component. The teeth are configured to mesh with corresponding teeth of the elevation system component to mechanically secure the elevation system component within the socket during deployment of the elevation system. As a corollary, a protrusion of the elevation system component is threaded to include the corresponding teeth along with an alignment component that glides along the alignment component of the socket and prevents premature meshing of the teeth before full insertion into the socket.

In implementations where the elevation system component is a leg of the elevation system, the leg is threaded at an end opposite the protrusion to receive a table foot for the portable cutting apparatus. The leg is threaded in a manner that enables extension of the table foot away from the portable cutting apparatus, thereby enabling individual height adjustment for different legs of the elevation system. In some implementations, the table foot is configured to include a hollow cavity that permits articulation of a base of the table foot, thus enabling the table foot to adapt to a variety of angles of a surface upon which the portable cutting apparatus is deployed.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

FIG. 5 depicts a procedure in an example implementation in which a storage cavity of a portable cutting apparatus is formed by attaching reinforcement plates to a bottom surface of a cutting board.

FIG. 14 depicts a procedure in an example implementation in which an elevation system for a portable cutting apparatus is deployed by forming a socket in the portable cutting apparatus, forming a leg of the elevation system, and meshing the leg of the elevation system with the socket.

DETAILED DESCRIPTION

Overview

Figure 1:
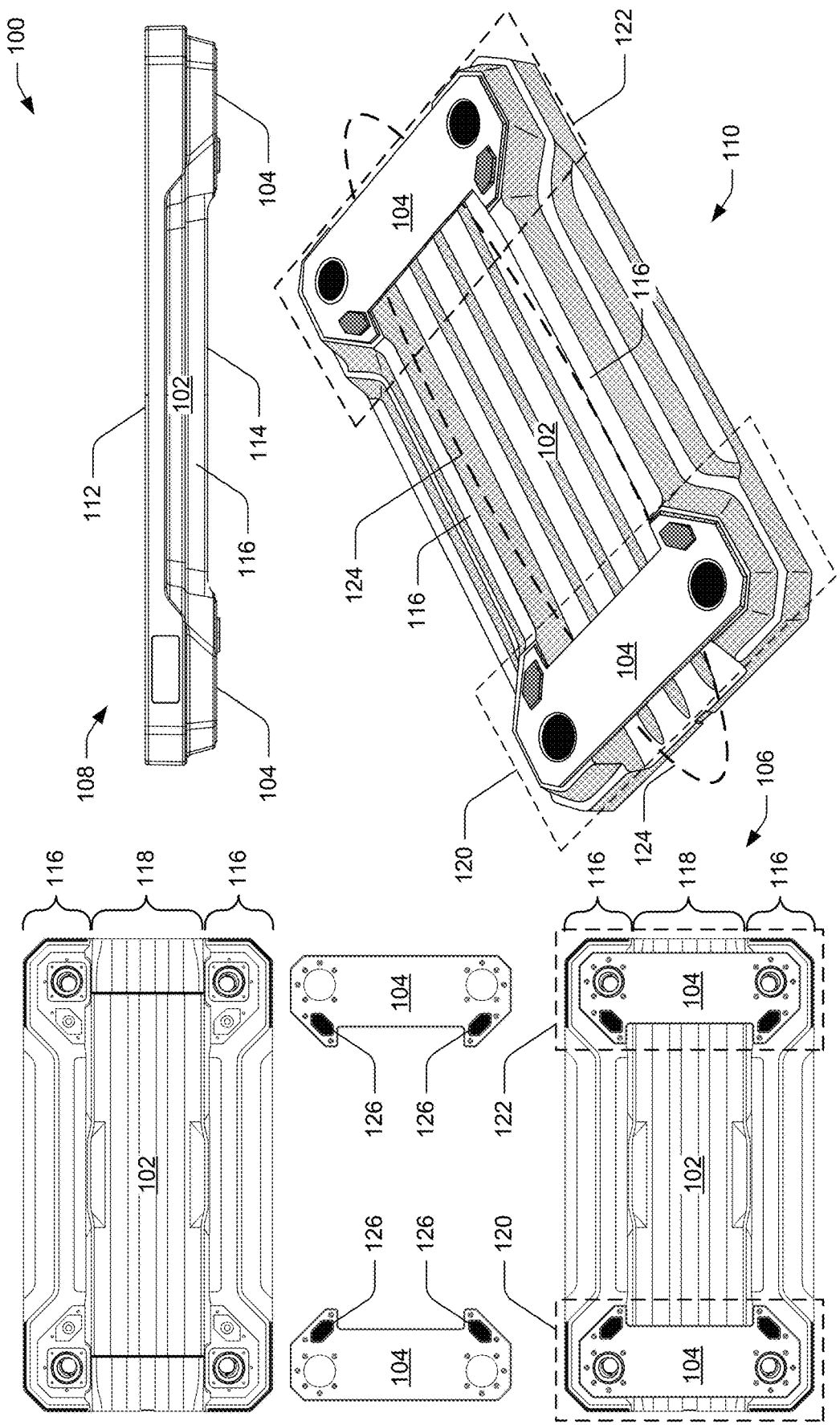
FIG. 1 is an illustration of a portable cutting apparatus having a cutting board and reinforcement plates that form a cavity for storing an elevation system.

To overcome these problems, a portable cutting apparatus is described. In accordance with the described techniques, the portable cutting apparatus includes a cutting board having a cutting surface and a bottom surface. The cutting board is formed so that the bottom surface includes side walls which are disposed along opposite edges of the bottom surface of the cutting board. In one or more implementations, the cutting board may be formed using a roto-molding technique, such that the cutting board comprises roto-molded polyethylene. By using roto-molding—rather than forming the cutting board using other techniques like blow molding—the cutting board may be more durable than cutting surfaces that are formed using those other techniques. Moreover, the roto-molded polyethylene cutting board may be injected with foam, which further increases the durability of the cutting board as compared to cutting surfaces formed using those other techniques.

The portable cutting apparatus also includes an elevation system to elevate the cutting board. By elevating the cutting surface of the cutting board, the elevation system may enable users to deploy the portable cutting apparatus in a manner that is more ergonomically friendly, sanitary, and convenient, than simply placing a cutting board on various surfaces, such as on the ground, a cooler, a user's lap while seated, or a truck tailgate, to name just a few. Another advantage of the portable cutting apparatus is that it provides a standalone, dedicated cutting surface. This allows a user to position the portable cutting apparatus away from tables or other surfaces where users may cut or prepare food, and in so doing, prevent whatever the user is handling on the cutting surface from contaminating food being prepared on those other surfaces (and vice-versa).

The portable cutting apparatus also includes first and second reinforcement plates which provide reinforcement for the elevation system when the portable cutting apparatus is in an elevated state. The reinforcement plates may be attached to the side walls at opposite ends of the bottom surface of the cutting board. In one or more implementations, the elevation system may include a plurality of legs which may be inserted into sockets (e.g., screwed into the sockets) positioned on the bottom surface of the portable cutting apparatus. The reinforcement plates may include apertures (e.g., holes), through which the ends of the ends of the legs pass, when the legs are received in the sockets. An advantage of a configuration where the legs of the elevation system screw into the sockets is that the legs may be easily deployed and removed by simply screwing them in and unscrewing them, respectively.

To facilitate secure mechanical coupling of an elevation system leg within a socket, the socket is threaded to include an alignment component and teeth and a protrusion of the leg is similarly threaded to include a corresponding alignment component and teeth configured to mesh with the socket teeth. The alignment components ensure that the leg is properly aligned with, and fully inserted into, the socket before meshing the respective leg and socket teeth. To do so, the alignment components each include a ramp surface, oriented to glide along one another and rotationally bias the leg towards alignment with the socket during insertion of the leg into the socket.

One or more of the alignment components additionally include a front mesh guard, which is configured to prevent the socket and leg teeth from meshing with one another prematurely (e.g., during insertion of the leg into the socket and prior to complete insertion of the leg into the socket). In some implementations, the socket threading is further configured to include a rear mesh guard, which restricts a point at which a leg can be screwed into a socket and prevents re-meshing of the socket and leg teeth when unscrewing the leg from the socket. In this manner, the rear mesh guard further provides tactile feedback that informs a user of the portable cutting apparatus when a leg is mechanically secured (e.g., fully meshed) with a socket as well as when the leg is aligned for removal (e.g., unscrewed) from the socket. In some configurations, instead of including apertures that pass through to sockets formed in the bottom surface of the cutting board, the sockets are formed as part of the reinforcement plates themselves.

In addition to providing reinforcement for the elevation system, the first and second reinforcement plates act in concert with the side walls to form a storage cavity for storing the elevation system (e.g., the legs) when the portable cutting apparatus is in a storage state. In other words, the elevation system may be stored in the storage cavity of the portable cutting apparatus when the elevation system is not deployed to elevate the portable cutting apparatus. Storing the elevation system within the storage cavity enables the portable cutting apparatus to be more "compact" than when the elevation system is deployed. This enables the portable cutting apparatus to be stored (e.g., in a trunk, in a truck bed, in a closet, or on a shelf) more easily than cutting apparatuses having an elevation system that remains deployed.

By storing the elevation system, the storage cavity also enables the elevation system to be stored together with the portable cutting apparatus—rather than separately from the portable cutting apparatus. This allows a user to carry or handle the portable cutting apparatus and its elevation system together. The ability to store the elevation system in the storage cavity may thus alleviate difficulties of having separate pieces, e.g., the storage may reduce how often a user needs to pick up and load his or her arms with the portable cutting apparatus and elevation system, separately, and may also reduce or eliminate the need to determine how to stuff the portable cutting apparatus and the elevation system into a separate storage container such as a bag or box.

The elevation system is further configured to include adjustable feet that enable level and secure positioning of the portable cutting apparatus when deployed across a variety of surfaces and terrains. To do so, an end of a leg of the elevation system configured to contact a surface (e.g., ground) upon which the portable cutting apparatus is deployed is threaded to receive a foot. The threading is configured to enable removal and replacement of the foot, as well as adjustment of a distance from the end of the leg at which the foot is disposed. For instance, the foot can be twisted in a first direction to extend the foot away from the end of the leg and twisted in a second direction to retract the foot towards the end of the leg. In this manner, a length of each leg of the elevation system can be individually adjusted to provide a level cutting surface even when the portable cutting apparatus is deployed on uneven terrain. In some implementations, a table foot is configured with a hollow cavity that enables a based of the table foot to articulate within a socket formed by the end of the elevation system leg, thereby enabling the foot to provide a secure contact area and prevent the portable cutting apparatus from sliding on a variety of surfaces and at a variety of angles.

In the following discussion, an example a portable cutting apparatus is described by way of example as comprising reinforcement plates attached to a roto-molded cutting board to form a cavity for storing an elevation system. However, it should be readily apparent that the following discussion is not limited to a cutting board. Reinforcement plates may be attached to other roto-molded objects to form cavities for storing elevation systems that can be deployed to elevate those objects without departing from the spirit or scope of the described techniques.

Portable Cutting Apparatus

FIG. 1 is an illustration of an example 100 implementation of a portable cutting apparatus having a cutting board and reinforcement plates that form a cavity for storing an elevation system. The illustrated example 100 includes cutting board 102 and reinforcement plates 104. In this example 100, the cutting board 102 and the reinforcement plates 104 are depicted assembled as a portable cutting apparatus in views 106-108, which include bottom view 106, side view 108, and graphical projection view 110.

In accordance with the described techniques, the cutting board 102 includes cutting surface 112 and bottom surface 114. The cutting board 102 is formed so that the bottom surface 114 includes side walls 116. The side walls 116 are disposed along opposite edges of the bottom surface 114 of the cutting board 102, such that a channel 118 is formed between the side walls 116, separating the side walls 116.

In one or more implementations, the cutting board 102 may be formed using a roto-molding technique, such that the cutting board 102 comprises roto-molded polyethylene. Using a roto-molding technique, the cutting board 102 may be formed by heating plastic (e.g., polyethylene) in a mold for the cutting board 102 and by rotating the mold (e.g., bidirectionally) over a period of time. While the plastic is heated, such rotation causes the heated plastic to coat (e.g., substantially evenly) an inner surface of the mold, forming the cutting board 102 as a plastic shell. The plastic and mold are then cooled, such that the plastic shell can be removed from the mold. In one or more implementations, the shell is also filled with foam. By way of example, once the roto-molded cutting board 102 is removed from its mold, the cutting board 102 may be pressure injected with the foam, e.g., a high-density polyurethane foam.

By using roto-molding—rather than forming the cutting board 102 using other techniques like blow molding—the cutting board 102 may be more durable than cutting surfaces that are formed using those other techniques. Filling a roto-molded shell, e.g., by pressure injecting foam, can also further increase the durability of the cutting board 102 relative to cutting surfaces formed using those other techniques. Additionally, by filling the cutting board 102 with a material, such as foam, the cutting board 102 has a substantially "solid" construction and not a "hollow" construction. This contrasts with various conventionally configured cutting surfaces having elevation systems. Although forming the cutting board 102 using roto-molding and injected foam is discussed, it is to be appreciated that the cutting board 102 may be formed in other ways without departing from the spirit or scope of the described techniques.

As illustrated in the bottom view 106 and the graphical projection view 110, the reinforcement plates 104 may each be attached to both of the side walls 116 in accordance with the described techniques. In particular, a first of the reinforcement plates 104 may be attached to the side walls 116 at a first end 120 of the bottom surface 114 of the cutting board 102, such that this first reinforcement plate spans from a first of the side walls 116 at the first end 120, across the channel 118 at the first end 120, and to a second of the side walls 116 at the first end 120. Further, a second of the reinforcement plates 104 may be attached to the side walls 116 at a second end 122 of the bottom surface 114 of the cutting board 102, such that this second reinforcement plate also spans from the first of the side walls 116 at the second end 122, across the channel 118 at the second end 122, and to the second of the side walls 116 at the second end 122. As depicted, the first end 120 and the second end 122 may be positioned at opposite ends of the bottom surface 114 of the cutting board 102. In one or more implementations, the side walls 116 may be substantially parallel to an axis, e.g., a longitudinal axis of the cutting board 102 or an axis that runs substantially along an edge of a rectangularly-shaped cutting board. The reinforcement plates 104 may be attached to the side walls 116 so that the reinforcement plates 104 are positioned substantially orthogonal (perpendicular) to such an axis and thus also the side walls 116. In one or more implementations, the reinforcement plates 104 are formed from a different material than the cutting board 102. For example, the reinforcement plates 104 may be metal whereas the cutting board 102 comprises a roto-molded object.

Regardless, attaching the reinforcement plates 104 to the cutting board 102 forms a storage cavity 124 of the portable cutting apparatus. Here, the storage cavity 124 is disposed between the side walls 116 (e.g., along an axis substantially parallel to a sagittal axis of the portable cutting apparatus) and between the channel 118 and the reinforcement plates 104 (e.g., along axes substantially parallel to a vertical axis of the portable cutting apparatus). The storage cavity 124 formed by attaching the reinforcement plates 104 is configured to store an elevation system (not shown) for elevating the portable cutting apparatus. For example, the elevation system may be stored in the storage cavity 124 of the portable cutting apparatus when the elevation system is not deployed to elevating the portable cutting apparatus. An example of an elevation system is discussed in more detail in relation to FIG. 2.

By storing the elevation system, the storage cavity 124 enables the portable cutting apparatus to be more "compact" than when the elevation system is deployed. This enables the portable cutting apparatus to be stored (e.g., in a trunk, in a truck bed, in a closet, or on a shelf) more easily than cutting apparatuses having an elevation system that remains deployed. By storing the elevation system, the storage cavity 124 also enables the elevation system to be stored together with the portable cutting apparatus—rather than separately from the portable cutting apparatus. This allows a user to carry or handle the portable cutting apparatus and its elevation system together. The ability to store the legs in the storage cavity 124 may thus alleviate difficulties of having separate pieces, e.g., the storage may reduce how often a user needs to pick up and load his or her arms with the portable cutting apparatus and elevation system, separately, and may also reduce or eliminate the need to determine how to stuff the portable cutting apparatus and the elevation system into a separate storage container such as a bag or box.

In the illustrated example 100, the reinforcement plates 104 are also depicted having table feet 126. The table feet 126 may be configured to elevate the cutting board 102 and the reinforcement plates 104 a first height above a surface on which the portable cutting apparatus is disposed. In accordance with the described techniques, this first height is less than a second height that the elevation system is configured to raise the cutting board 102 and the reinforcement plates 104 above the surface.

Additionally or alternatively, the table feet 126 may be configured to prevent the portable cutting apparatus from sliding across a surface, or otherwise reduce sliding, e.g., when the portable cutting apparatus is placed on the surface such that the table feet 126 physically contact the surface. The table feet 126 may be configured to prevent the portable cutting apparatus from sliding across a surface when the portable cutting apparatus is being used, e.g., when a user is cutting on the cutting surface 112 of the cutting board 102. For instance, the table feet 126 may prevent the portable cutting apparatus from sliding on a tailgate of a truck, a surface of a boat, or a kitchen counter, to name just a few. In this mode, a user may use the portable cutting apparatus with the elevation system stored, which contrasts with a mode where portable cutting apparatus is used with the elevation system deployed. In one or more implementations, for example, the table feet 126 may be formed of a material such as rubber, which may prevent the portable cutting apparatus from sliding on a variety of surfaces and at a variety of angles. It is to be appreciated that the table feet 126 may be formed from other materials without departing from the spirit or scope of the techniques described herein, and also that in one or more implementations, the portable cutting apparatus may not include the table feet 126.

Having discussed how the cutting board 102 and the reinforcement plates 104 form a cavity for storing an elevation system, consider the following example in which an elevation system and its deployment are discussed.

Figure 2:
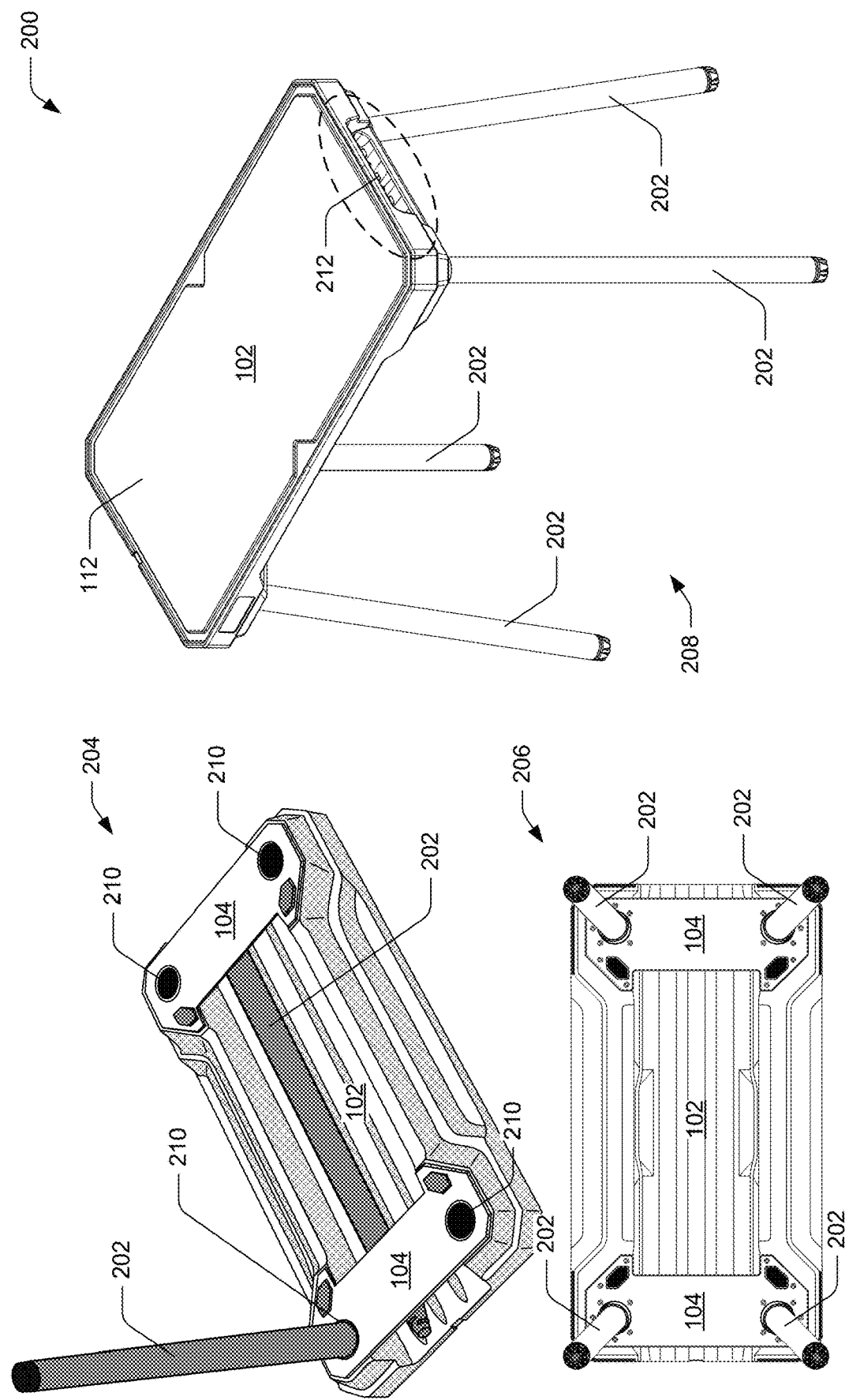
FIG. 2 depicts the portable cutting apparatus in various stages of deployment of the elevation system.

FIG. 2 depicts examples 200 of the portable cutting apparatus in various stages of deployment of the elevation system. In particular, the illustrated example 200 depicts deployment of elevation system 202 via various views, including a bottom projection view 204, a bottom view 206, and a top projection view 208.

In accordance with the described techniques, the elevation system 202 may comprise a plurality of legs. The bottom projection view 204 and the bottom view 206, depict insertion of the legs of the elevation system 202 into sockets 210 of the portable cutting apparatus. In one or more implementations, the sockets 210 may include leg cups disposed in the cutting board 102. The leg cups may be threaded to enable ends of the legs, having threading that corresponds to threading of the leg cups, to be received by (e.g., screwed into) the sockets 210. The reinforcement plates 104 may include apertures (e.g., holes), through which the ends of the ends of the legs pass, when the legs are received in the leg cups. In one or more implementations, the apertures may also include threading for receiving the ends of the legs. Although the leg cups are described as being separate from the reinforcement plates 104, in one or more implementations, such leg cups may be integral with the reinforcement plates 104 such that the leg cups are "dropped" into cup holes of the molded cutting board 102 when the reinforcement plates 104 are attached to the cutting board 102.

An advantage of a configuration where the legs of the elevation system 202 screw into the sockets 210 is that the legs may be easily deployed and removed by simply screwing them in and unscrewing them, respectively. An example configuration where the legs of the elevation system 202 screw into the sockets 210 is described and illustrated in further detail below with respect to FIGS. 6-11C. Nevertheless, legs of the elevation system 202 may be deployed and removed in different ways without departing from the spirit or scope of the described techniques. Additionally or alternatively, the elevation system 202 may be configured in a different way from using legs without departing from the spirit or scope of the described techniques. By way of example, in one or more implementations the elevation system 202 may be configured with two or more elevation walls (e.g., which each attach to an opposite end of the cutting board 102). Regardless of its particular configuration, though, the elevation system 202 is nevertheless configured for storage within the storage cavity 124 formed by attaching the reinforcement plates 104 to the cutting board 102.

In the bottom projection view 204, the elevation system 202 is depicted partially deployed and partially stored. In particular, the bottom projection view 204 depicts one leg of the elevation system 202 disposed in a socket 210, e.g., "deployed". The bottom projection view 204 also depicts one leg of the elevation system 202 disposed in the storage cavity 124, e.g., "stored" in the storage cavity 124. It is to be appreciated that in the bottom projection view 204 two of the legs are not depicted. Although the illustrated example 200 depicts an implementation where the elevation system 202 includes four legs and four sockets 210, it is to be appreciated that leg-based configurations of the elevation system 202 may have different numbers of legs without departing from the spirit or scope of the described techniques.

In the bottom view 206 and the top projection view 208, the elevation system 202 is depicted fully deployed. In connection with the illustrated example 200, the phrase "fully deployed" refers to a state where all of the legs of the elevation system 202 have been inserted into the sockets 210 and are secured, e.g., the threaded ends of the legs have been screwed into the corresponding threading of the sockets 210, as described in further detail below with respect to FIGS. 6-11C.

Generally speaking, the elevation system 202 is configured to elevate the cutting board 102 and the reinforcement plates 104 of the portable cutting system. The elevation system 202 may elevate the cutting board 102 and the reinforcement plates 104 a height above a surface on which the portable cutting apparatus is deployed. As noted above, this height is higher than a height that the table feet 126 are configured to elevate the cutting board 102 and the reinforcement plates 104 above a surface.

In one or more implementations, the elevation system 202 may be configured to elevate the cutting board 102 and the reinforcement plates 104 to a height that enables a user to stand while using the cutting surface 112, e.g., to prepare food or drinks, filet fish, or process game. Additionally or alternatively, the elevation system 202 may enable the cutting board 102 and the reinforcement plates 104 to be elevated to a plurality of different heights or across a range of heights, e.g., the elevation system 202 may be adjustable to different the height to which it elevates the cutting board 102 and the reinforcement plates 104. By way of example, legs of the elevation system 202 may be telescoping or otherwise extendable and retractable to different heights. In this way a height of the cutting board 102 and the reinforcement plates 104 may be adjusted for users using the apparatus having a range of different heights and/or anatomy, e.g., long or short legs. An example implementation where legs of the elevation system 202 are adjustable to different heights is described in further detail below with respect to FIGS. 12 and 13. Alternatively, legs of the elevation system 202 may have a substantially static length (e.g., only end-caps of the legs may be adjustable to steady the table on an uneven surface), where the length is designed to elevate the cutting board 102 and the reinforcement plates 104 to a height that is generally suitable for a range of users.

By elevating the cutting surface 112 of the cutting board 102, the elevation system 202 may enable users to deploy the portable cutting apparatus in a manner that is more ergonomically friendly, sanitary, and convenient, than simply placing a cutting board on various surfaces, such as on the ground, a cooler, a user's lap while seated, or a truck tailgate, to name just a few. Another advantage of the portable cutting apparatus is that it provides a standalone, dedicated cutting surface. This allows a user to position the portable cutting apparatus away from tables or other surfaces where users may cut or prepare food, and in so doing, prevent whatever the user is handling on the cutting surface 112 from contaminating food being prepared on those other surfaces (and vice-versa).

In one or more implementations, the reinforcement plates 104 provide reinforcement for the elevation system 202 when the elevation system 202 elevates the portable cutting apparatus into the elevated state. By way of example, the reinforcement plates 104 may be formed from a material such as metal. Due to being constructed from metal, the reinforcement plates 104 may structurally reinforce (by bracing the side walls 116 across the channel 118) the portable cutting apparatus. The reinforcement plates 104 may also provide a more secure fit of the elevation system 202 (e.g., its legs) into receptacles of the portable cutting apparatus (e.g., the sockets 210) than the receptacles may provide without the reinforcement plates 104.

In the illustrated example 200, the top projection view 208 shows a portion of a threshold mechanism 212 configured to secure the elevation system 202 when stored in the storage cavity 124. In the context of securing the elevation system 202 in the storage cavity 124, consider the following discussion.

Figure 3:
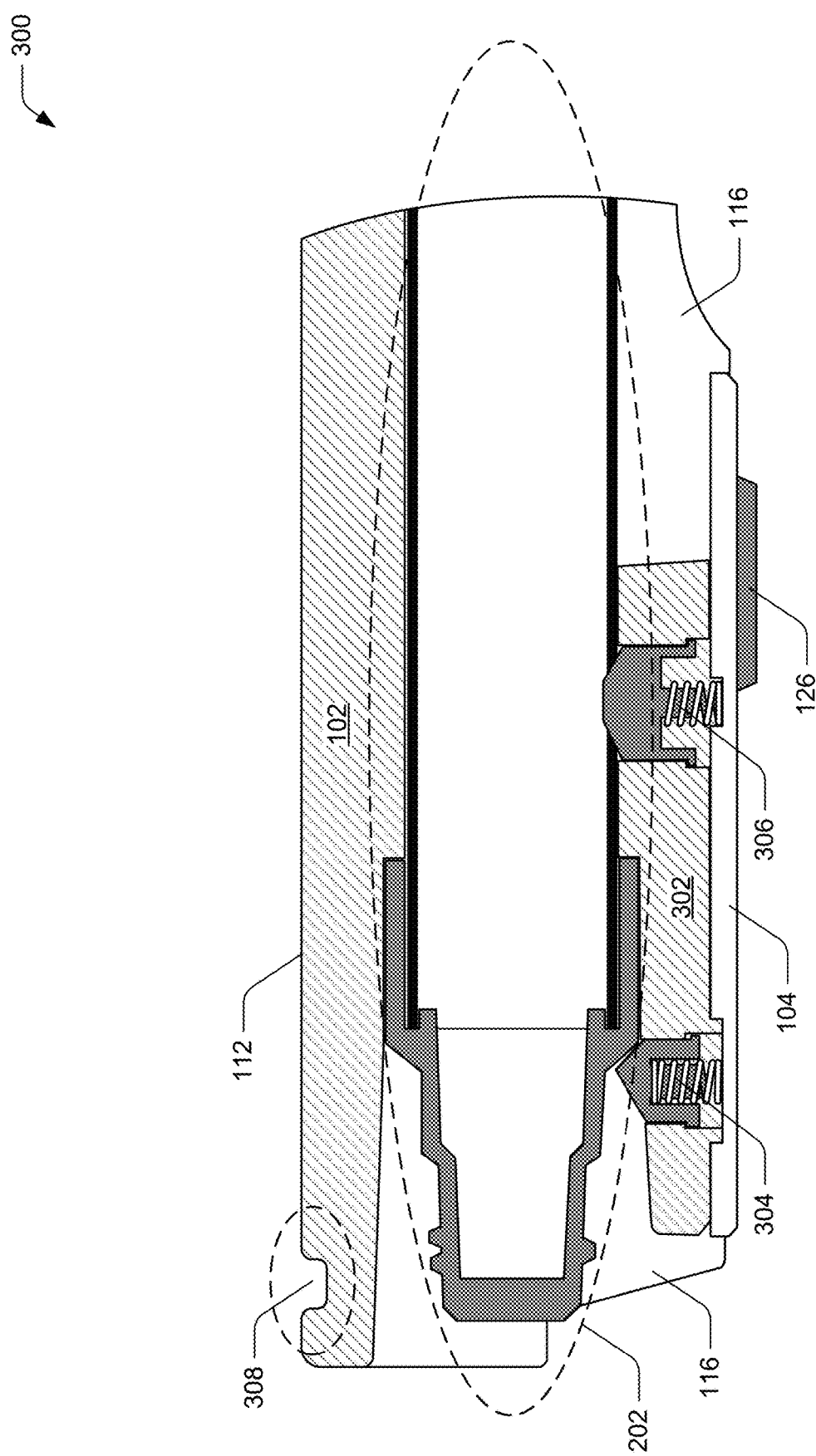
FIG. 3 depicts a cutaway view of the portable cutting apparatus showing a threshold mechanism to secure the elevation system in the cavity.

FIG. 3 depicts an example 300 of a cutaway view of the portable cutting apparatus showing a threshold mechanism to secure the elevation system in the cavity.

In the illustrated example 300, the cutaway view depicts the cutting board 102, the reinforcement plates 104, the table feet 126, and the elevation system 202 (e.g., a leg). The illustrated example 300 also includes threshold bridge 302, which is depicted having a latch 304 and a bumper 306. In this example 300, the threshold bridge 302, the latch 304, and the bottom projection view 204 form the threshold mechanism.

In general, the threshold mechanism is configured to removably secure the elevation system 202 within the storage cavity 124, formed by attaching the reinforcement plates 104 to the cutting board 102. In the scenario where the elevation system 202 includes legs, for example, the threshold mechanism is configured to mechanically secure the legs within the storage cavity 124 so that the legs cannot be easily removed without a targeted (e.g., intentional) application of force to remove the legs from the storage cavity 124. In other words, the threshold mechanism is configured to mechanically secure the elevation system 202 so that it does not "fall out" of the storage cavity 124 while the portable cutting apparatus is simply being carried or otherwise moved. Nonetheless, the threshold mechanism is also configured to allow the elevation system 202 to be removed from the storage cavity 124 with a targeted application of force, such as an application of force by a user to pull the elevation system 202 out of the cavity through the threshold mechanism, where the application of force has a magnitude and a direction sufficient to overcome one or more securing components of the threshold mechanism.

In this example 300, the latch 304 and the bumper 306 may be configured as the securing components of the threshold mechanism. As illustrated, the latch 304 and the bumper 306 may be configured to secure the elevation system 202 using springs. Springs of the latch 304 and the bumper 306 may have a stiffness that causes those springs to have a resting position which disposes the latch 304 and the bumper 306 in positions to secure the elevation system 202, e.g., by pressing the elevation system 202 against a surface of the channel 118 within the storage cavity 124. The stiffness of those springs may also be selected so that the springs compress responsive to a targeted force to remove the elevation system 202 from the storage cavity 124. Responsive to such a targeted force, for example, the springs of the latch 304 and the bumper 306 may be configured to compress, allowing the elevation system 202 to pass over the latch 304 and the bumper 306. The springs of the latch 304 and the bumper 306 may also be configured to compress when the elevation system 202 passes over the latch 304 and the bumper 306 during insertion into the storage cavity 124. When those springs are compressed, they store mechanical energy. When there is space for the springs to advance the latch 304 and the bumper 306 away from the reinforcement plates 104, though, the mechanical energy stored in the springs causes the springs to decompress (e.g., spring) back toward their resting positions.

To this end, the elevation system 202 may have a shape configured to enable securing components, such as the latch 304, to actuate to a position that secures the elevation system 202, responsive to the elevation system 202 being disposed substantially in a storage position. As discussed in more detail below, the portable cutting apparatus may be configured with a threshold bridge 302 at each end, e.g., a first threshold bridge 302 at the first end 120 and a second threshold bridge 302 at the second end 122. In such a configuration, the pair of threshold bridges may be configured identically or substantially identically, e.g., both threshold bridges may include a similar or same set of the latches 304 and the bumpers 306—each threshold bridge may include a latch and a bumper for each leg. In this way, the bumpers 306 may be configured to press against the legs at both ends, e.g., a bumper of one threshold bridge may press against a leg proximate the end of the leg (the portion inserted into the leg cups) and a bumper of the other threshold bridge may press against that leg proximate a foot of the leg (the portion contacting the ground when in the elevated state). In this way, the bumpers 306 may prevent one or more portions of the elevation system 202 from "rattling around" in the storage cavity 124.

Additionally, an end of each leg of the elevation system 202 may have a shape that is configured to contact a portion of the threshold bridge 302 (e.g., a wall or lip of the bridge's surface) and the latch 304 when the leg is inserted into the storage cavity 124 and reaches the storage position. In the storage position, the end of the leg may be shaped so that a portion of the shape is secured between the latch 304 in the non-compressed position and the portion of the threshold bridge 302 (e.g., the wall or lip). The threshold bridge 302 may include various combinations of securing components, such as combinations having at least one latch and/or at least one bumper.

In one or more implementations, the threshold bridge 302 is attached to one of the reinforcement plates 104, such that each reinforcement plate has a respective threshold bridge 302. In such implementations, the legs can be inserted into the storage cavity 124 via either end of the portable cutting apparatus, e.g., there may be threshold mechanisms 212 at one or both ends 120, 122 of the portable cutting apparatus. The reinforcement plates 104 and their respective threshold bridge 302 may be attached to form a threshold assembly. In this way, when the reinforcement plates 104 are attached to the cutting board 102, the threshold bridges 302 are also attached as part of the portable cutting apparatus. By way of example, the threshold bridge 302 may be inserted between the side walls 116 of the cutting board 102, such that the threshold bridge 302 contacts the side walls 116. Thus, when the threshold assembly is attached to the cutting board 102 for operation, the threshold bridge 302 may contact the side walls 116 along the channel 118, and the respective reinforcement plate 104 may contact the side walls 116 along a surface of the cutting board 102 that faces a surface on which the portable cutting apparatus is deployed.

Although the threshold mechanism is discussed as comprising a threshold bridge 302 with a plurality of the latches 304 and the bumpers 306 to mechanically secure the elevation system 202 (e.g., legs) while stored in the storage cavity 124 (e.g., based on springs), it is to be appreciated that the threshold mechanism may be configured in different ways to secure the elevation system 202 within the storage cavity 124 in the spirit or scope of the described techniques.

In the illustrated example 300, the cutting board 102 also is depicted having drip channel 308. In general, the drip channel 308 is configured to hold liquids (e.g., blood) that flow from the cutting surface 112. By holding those liquids, the drip channel 308 may reduce an amount of liquid on the cutting surface 112 while a user is cutting. This may enable safer and easier cutting on the cutting surface 112 of the portable cutting apparatus. Consider the following discussion of FIG. 4, which describes one example of the drip channel 308.

Figure 4:
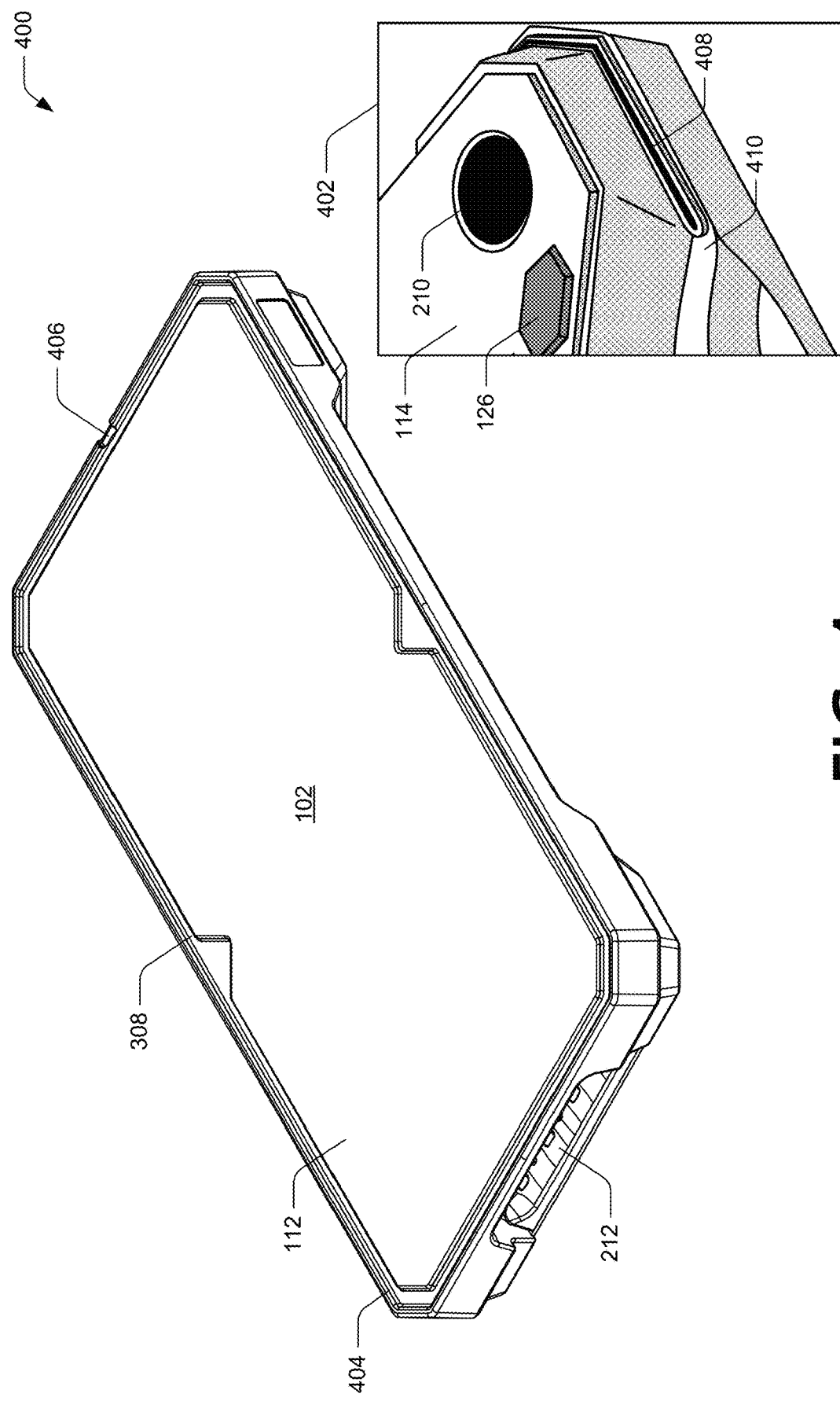
FIG. 4 depicts a cutting surface of the portable cutting apparatus along with a view of a portion of a bottom surface of the portable cutting apparatus.

FIG. 4 depicts an example 400 of a cutting surface of the portable cutting apparatus along with a view of a portion of a bottom surface of the portable cutting apparatus.

The illustrated example 400 includes the cutting board 102 from FIG. 1. In particular, the illustrated example 400 depicts a view of the cutting surface 112 of the cutting board 102 along with a separate view 402 of a portion of the bottom surface 114 of the cutting board 102. In this example 400, the drip channel 308 is depicted bordering the cutting surface 112 and is further surrounded by lip 404, which enables liquids to be captured and held in the drip channel 308 and routed to a spillway 406 rather than simply spill over any edge of the portable cutting apparatus.

In one or more implementations, the portable cutting apparatus also includes one or more accessory attachment mechanisms 408. In the illustrated example, the accessory attachment mechanism 408 is depicted as a protrusion, e.g., protruding from the bottom surface 114 of the cutting board 102. It is to be appreciated, however, that in one or more implementations, the accessory attachment mechanisms 408 may be configured as cavities rather than protrusions. Indeed, the accessory attachment mechanisms 408 may be configured in a variety of ways to enable accessories to be clipped to the portable cutting apparatus.

By way of example, the accessory attachment mechanisms 408 may be positioned substantially at corners of the bottom surface 114 of the cutting board 102, e.g., one mechanism at each corner. For instance, the accessory attachment mechanisms 408 may be positioned on or within shelves 410 at the corners of the bottom surface 114, e.g., protrusions may be attached to the shelves 410 or cavities may be formed into those shelves 410. Accessories may thus be removably attached to corners of the portable cutting apparatus. It is to be appreciated that the portable cutting apparatus may include accessory attachment mechanisms 408 at different locations, e.g., along the ends 120, 122, of the bottom surface 114 without departing from the spirit or scope of the techniques described herein.

In general, the accessory attachment mechanisms 408, in concert with the drip channel 308 and the lip 404, may enable accessories to be "clipped" onto the cutting board 102. By way of example, an accessory may include a first channel having a complementary shape to the lip 404 and a second channel or a protrusion having a complementary shape to the accessory attachment mechanisms 408. When the accessory attachment mechanisms 408 are configured as protrusions, an accessory configured with first and second channels may be clipped onto the cutting board 102 such that the lip 404 is disposed in the first channel of the accessory and an accessory attachment mechanism 408 is disposed in the second channel of the accessory. When the accessory attachment mechanisms 408 are configured as cavities, an accessory configured with a channel complementary to the lip 404 and a protrusion complementary to the mechanism may be clipped onto the cutting board 102 such that the lip 404 is disposed into the accessory's channel and such that the accessory's protrusion is disposed within the accessory attachment mechanism 408. Examples of accessories may include, but are not limited to, beverage holders, knife or other utensil holders, tool holders, surface extensions, and lighting, to name just a few. It is to be appreciated that accessories may be clipped around edges of the cutting board 102 in different ways in the spirit or scope of the techniques described herein.

In one or more implementations, the cutting surface 112 with the drip channel 308 may be configured to interface with one or more additional cutting surfaces. By way of example, an additional cutting surface having a depth and a width substantially similar to the cutting surface may be disposed "on top" of the cutting surface 112. For instance, a user may place an aesthetically pleasing (e.g., acacia, teak, or bamboo) additional cutting surface on top of the cutting surface 112. Such an additional cutting surface may include protrusions having a complementary shape to the drip channel 308, such that when the additional cutting surface is placed on top of the cutting surface 112, those protrusions are disposed in the drip channel 308. As mentioned above, the cutting surface 112 may be configured to have two additional cutting surfaces placed on top, such that the two additional cutting surfaces are placed side-by-side. Each of those additional cutting surfaces may have protrusions that match a respective half of the drip channel 308, such that when one those additional cutting surfaces is placed on the cutting surface 112 its protrusions are disposed within a respective half of the drip channel 308. It is to be appreciated that the portable cutting apparatus may be configured in different ways for the removable attachment of accessories without departing from the spirit or scope of the described techniques.

Having discussed exemplary details of the portable cutting apparatus, consider now some examples of procedures to illustrate additional aspects for deployment of the apparatus.

Example Portable Cutting Apparatus Procedures

This section describes examples of procedures for the portable cutting apparatus. The procedures are shown as a set of blocks that specify operations performed and are not necessarily limited to the orders shown for performing the operations by the respective blocks.

FIG. 5 depicts a procedure 500 in an example implementation in which a storage cavity of a portable cutting apparatus is formed by attaching reinforcement plates to a bottom surface of a cutting board.

A cutting board is formed to include a cutting surface and a bottom surface that includes side walls disposed along opposite edges of the bottom surface (block 502). By way of example, cutting board 102 is formed to include cutting surface 112 and bottom surface 114. The cutting board 102 is formed so that the bottom surface 114 includes side walls 116. The side walls 116 are disposed along opposite edges of the bottom surface 114 of the cutting board 102, such that a channel 118 is formed between the side walls 116, separating the side walls 116.

In one or more implementations, the cutting board 102 may be formed using a roto-molding technique, such that the cutting board 102 comprises roto-molded polyethylene. By using roto-molding—rather than forming the cutting board 102 using other techniques like blow molding—the cutting board 102 may be more durable than cutting surfaces that are formed using those other techniques. Filling a roto-molded shell, e.g., by pressure injecting foam, can also further increase the durability of the cutting board 102 relative to cutting surfaces formed using those other techniques. Additionally, by filling the cutting board 102 with a material, such as foam, the cutting board 102 has a substantially "solid" construction and not a "hollow" construction. This contrasts with various conventionally configured cutting surfaces having elevation systems.

A storage cavity is formed for storing an elevation system for the cutting board by attaching a first reinforcement plate to the side walls at a first end of the bottom surface of the cutting board and attaching a second reinforcement plate to the side walls at a second end of the bottom surface of the cutting board (block 504). By way of example, the reinforcement plates 104 may each be attached to both of the side walls 116 in order to form the storage cavity 124 for storing the elevation system 202. A first of the reinforcement plates 104 may be attached to the side walls 116 at a first end 120 of the bottom surface 114 of the cutting board 102, such that this first reinforcement plate spans from a first of the side walls 116 at the first end 120, across the channel 118 at the first end 120, and to a second of the side walls 116 at the first end 120. Further, a second of the reinforcement plates 104 may be attached to the side walls 116 at a second end 122 of the bottom surface 114 of the cutting board 102, such that this second reinforcement plate also spans from the first of the side walls 116 at the second end 122, across the channel 118 at the second end 122, and to the second of the side walls 116 at the second end 122. As depicted, the first end 120 and the second end 122 may be positioned at opposite ends of the bottom surface 114 of the cutting board 102. In one or more implementations, the side walls 116 may be substantially parallel to an axis, e.g., a longitudinal axis of the cutting board 102 or an axis that runs substantially along an edge of a rectangularly-shaped cutting board. The reinforcement plates 104 may be attached to the side walls 116 so that the reinforcement plates 104 are positioned substantially orthogonal (perpendicular) to such an axis and thus also the side walls 116.

The elevation system for the cutting board is stored within the storage cavity (block 506). By way of example, the elevation system 202 is stored within the storage cavity 124. In one or more implementations, the elevation system 202 may comprise a plurality of legs, each of which may be stored within the storage cavity 124.

Having discussed exemplary procedures for the portable cutting apparatus, consider now some example configurations of the portable cutting apparatus and elevation system to facilitate deployment of the apparatus.

Portable Cutting Apparatus Elevation System

Figure 6:
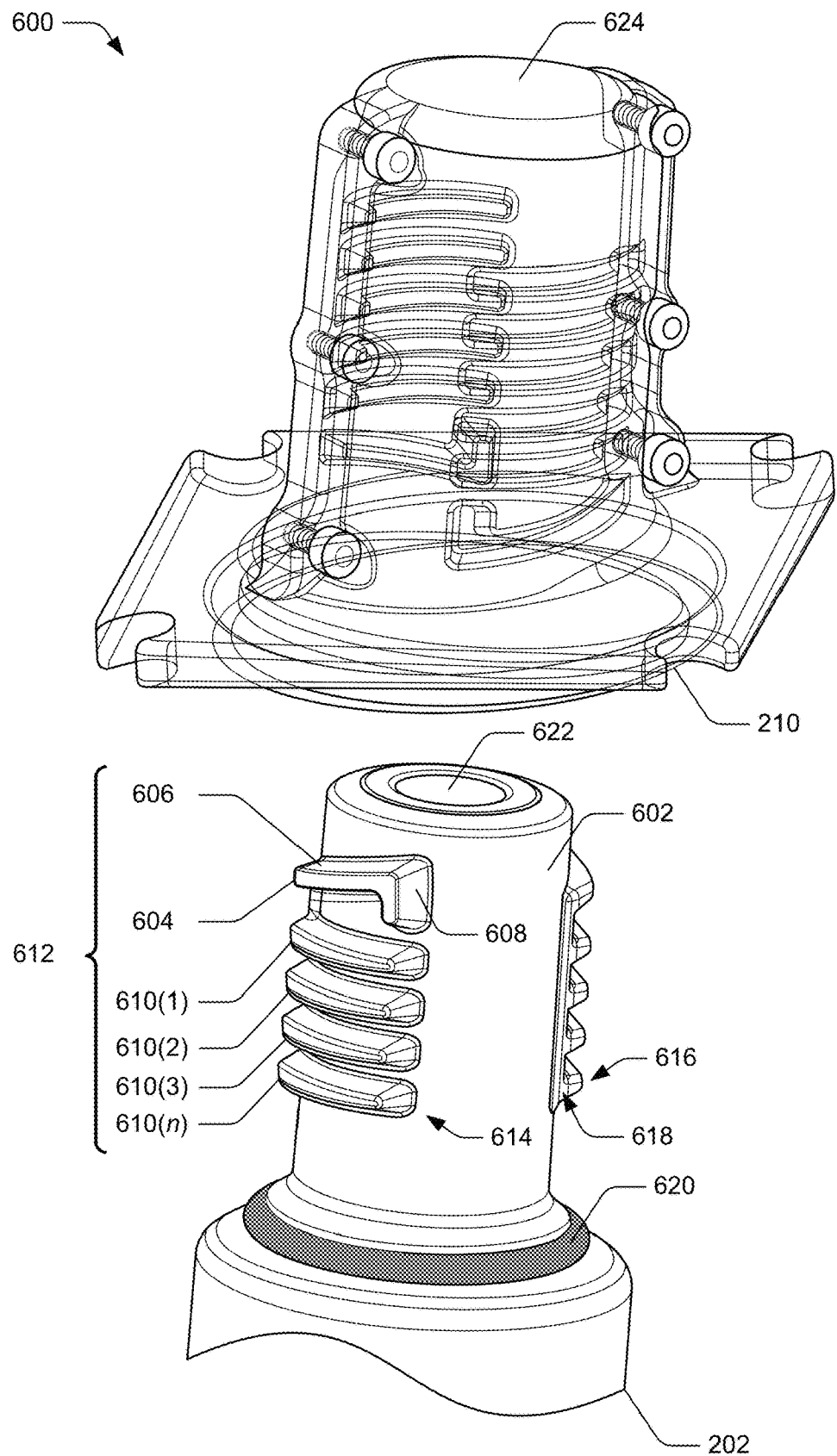
FIG. 6 depicts an element of the elevation system configured for insertion into, and removal from, a socket of the portable cutting apparatus.

FIG. 6 depicts an example 600 of an element of the elevation system configured for insertion into, and removal from, a socket of the portable cutting apparatus.

The illustrated example 600 includes a leg of the elevation system 202 and one of the sockets 210 from FIG. 2. In the illustrated example 600, the leg of the elevation system 202 includes a protrusion 602 configured for insertion into a cavity (e.g., a leg cup) of the socket 210. To enable mechanical coupling of the leg of the elevation system 202 within the socket 210, the protrusion 602 is threaded to include an alignment element 604.

The alignment element 604 includes a ramp surface 606 and a front mesh guard 608, which are configured to ensure proper alignment of the protrusion 602 with the socket 210 for mechanically coupling the leg of the elevation system 202 with the socket 210. To mechanically couple the leg of the elevation system 202 with the socket 210, the protrusion 602 includes one or more teeth 610, such as tooth 610(1), 610(2), 610(3), and 610(n), where n represents any suitable integer. For instance, in an example implementation where the protrusion 602 is configured with two teeth 610, n is defined as two. In another example implementation where the protrusion 602 is configured with ten teeth 610, n is defined as ten. In this manner, a number of teeth 610 included in the protrusion is configurable based on a size of the protrusion 602 and the socket 210 (e.g., a length of the protrusion 602, a depth of the socket 210, etc.), design parameters (e.g., manufacturing tolerances) for the portable cutting apparatus, and so forth, and is not limited by the example implementations described herein.

Collectively, the alignment element 604 and the one or more teeth 610 define a threading 612 for the protrusion. In some implementations, the protrusion 602 includes a plurality of threadings 612, where each threading 612 extends around a portion of a circumference of the protrusion 602. When the protrusion 602 is configured with multiple threadings 612, each threading 612 may be spaced from another threading 612 based on a length of a counterpart threading for the socket 210, as described in further detail below with respect to FIG. 7. In some implementations where the protrusion 602 is configured with multiple threadings 612, each threading 612 may be spaced from another threading 612 based on a length of the threading 612. For instance, a length of the threading 612 may be defined based on a distance from a leading edge 614 of the threading 612 to a trailing edge 616 of the threading 612. By way of example, the protrusion 602 and the threading 612 may be formed from a material such as metal (e.g., aluminum). Due to being constructed from metal, the protrusion 602 and the threading 612 provide structural support (by bracing the protrusion 602 within the socket 210) for the portable cutting apparatus during deployment of the elevation system 202.

In the illustrated example 600, the protrusion 602 is configured with two threadings 612 and depicted from a perspective where the leading edge 614 is visible for a first of the two threadings 612 and the trailing edge 616 is visible for a second of the two threadings 612. Each threading 612 is optionally configurable to include a rear mesh guard 618, which is configured to prevent the threading 612 from re-meshing with the socket 210 during removal of the protrusion, as described in further detail below.

The protrusion 602 is fitted with a seal ring 620, which is configured to create a seal between the leg of the elevation system 202 and the socket 210 when the leg of the elevation system 202 is fully inserted into the socket 210. In this manner, the seal ring 620 prevents debris (e.g., dust, liquid, etc.) from entering the socket 210 during deployment of the elevation system 202. In some implementations, full insertion of the leg of the elevation system 202 into the socket 210 occurs when a tip 622 of the protrusion 602 contacts a ceiling 624 of the socket (e.g., a deepest surface of a cavity defined by the socket 210, relative to the bottom surface 114). In such implementations, the tip 622 of the protrusion 602 contacting the ceiling 624 of the socket 210 provides a contact surface that supports the cutting board 102 together with the teeth 610 during deployment of the elevation system 202. Alternatively, full insertion of the leg of the elevation system 202 into the socket 210 occurs before the tip 622 contacts the ceiling 624 of the socket, such that a gap exists between the tip 622 of the protrusion 602 and the ceiling 624 of the socket 210 during deployment of the elevation system 202. In such alternative implementations, the teeth 610 support the cutting board 102 during deployment of the elevation system 202.

In some implementations, the tip 622 of the protrusion 602 is configured to receive a fastener (e.g., a screw) to couple the protrusion 602 to the leg of the elevation system 202, such that the protrusion 602 is fastened to a tip of the leg opposite a corresponding one of the table feet 126. Alternatively, the protrusion 602 may be formed as part of the leg of the elevation system 202 (e.g., molded as part of the leg, extruded as part of the leg, milled from the leg, and so forth), such that a fastener is not necessary to couple the protrusion 602 to the leg of the elevation system 202.

Figure 7:
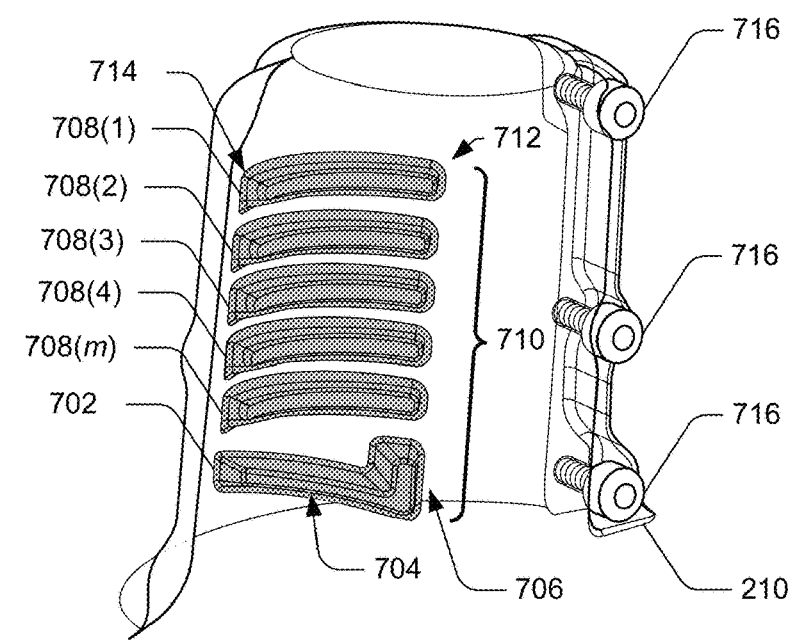
FIG. 7 depicts a cutaway view of a socket of the portable cutting apparatus configured to receive and mechanically secure an element of the elevation system.

FIG. 7 depicts an example 700 of a cutaway view of an element of the portable cutting apparatus configured to receive and mechanically secure a protrusion of the elevation system.

In the illustrated example 700, the cutaway view depicts the socket 210 exposed to reveal aspects of the socket 210 that enable mechanical coupling of the protrusion 602 with the socket 210. The socket 210 is threaded to include an alignment element 702, which is comprised of a ramp surface 704 and a front mesh guard 706. The ramp surface 704 is configured to interface with the ramp surface 606 of the alignment element 604 by gliding along the ramp surface 606 to bias rotation of the protrusion 602 for proper alignment with the socket 210 during insertion of the leg of the elevation system 202, as described in further detail below. The front mesh guard 706 is configured to prevent premature meshing of the teeth 610 with teeth 708 of the socket 210 during insertion of the leg of the elevation system 202 into the socket 210.

To mechanically couple the leg of the elevation system 202 with the socket 210, the socket is threaded with one or more teeth 708, such as tooth 708(1), 708(2), 708(3), 708(4), and 708(m), where m represents any suitable integer. For instance, when the socket 210 is configured with three teeth 708, m is defined as three, when the socket 210 is configured with nine teeth 708, m is defined as nine, and so forth. In this manner, a quantity of teeth 708 is generally defined based on a quantity of the teeth 610 of the protrusion 602, such that m=n±1.

In addition to being defined based on a quantity of the teeth 610, the teeth 708 are dimensioned to serve as counterparts for the teeth 610 to mechanically couple the protrusion 602 with the socket 210. For instance, the teeth 708 are spaced to be meshed with the teeth 610, such a gap between adjacent teeth 708 is configured to receive a height of a corresponding one of the teeth 610 (e.g., a dimension of the corresponding one of the teeth 610 that is generally perpendicular to an axis running from the leading edge 614 and the trailing edge 616 of the tooth). Collectively, the ramp surface 704 and the one or more teeth 708 define a threading 710 for the socket 210.

In some implementations, the socket 210 includes a plurality of the threadings 710, where each threading 710 extends around a portion of a circumference of an interior wall of the socket 210. When the socket 210 is configured with multiple threadings 710, each threading 710 is spaced from another threading based on a length of a corresponding threading 612 (e.g., a dimension spanning from a leading edge 614 to a trailing edge 616 of the threading 612). Similarly, a spacing between multiple threadings 612 around a circumference of the protrusion 602 is configured based on a length of a threading 710 of the socket 210, such as a dimension spanning from a leading edge 712 to a trailing edge 714 of the threading 710.

In some configurations, the teeth 708 extend away from an interior wall of the socket 210 at varying degrees along a length of the threading 710. For instance, each of the teeth 708 may be configured to extend away from the interior wall at a lesser "height" at the leading edge 712 and at a greater "height" at the trailing edge 714, such that each tooth 708 gradually extends from an interior surface of the socket at a greater degree from the leading edge 712 towards the trailing edge 714. Alternatively or additionally, one or more of the teeth 708 may be dimensioned to vary in "width" (e.g., a dimension measured along a depth of the socket 210) from the leading edge 712 to the trailing edge 714, such that a gap between adjacent teeth 708 decreases from the leading edge 712 towards the trailing edge 714 to bring the teeth 708 into contact with teeth 610 when the protrusion 602 is fully inserted and screwed into the socket 210.

In a configuration where the teeth 708 extend away from the interior surface of the socket 210 at a height that gradually increases from a leading edge 712 to a trailing edge 714, the teeth 708 are configured to restrict meshing of the teeth 610 using the rear mesh guard 618, as described in further detail below. For instance, when the protrusion 602 is fully inserted into the 210, a distance between the interior surface of the socket 210 upon which the threading 710 is disposed relative to the rear mesh guard 618 is greater than a "height" at which the leading edge 712 of the teeth 708 extends from the interior surface of the socket 210 and less than a "height" at which the trailing edge 714 of the teeth 708 extends from the interior surface of the socket 210.

By way of example, the interior surface of the socket 210 and the threading 710 may be formed from a material such as metal (e.g., aluminum). Due to being constructed from metal, the threading 710 is configured to provide structural support (by bracing the protrusion 602 within the socket 210) for the portable cutting apparatus during deployment of the elevation system 202. The threading 710 is configured to be formed as part of the socket 210 (e.g., molded or machined as part of the socket), such that the socket 210 and the threading 710 are formed from a single piece of material (e.g., a single piece of metal). In some implementations, the socket 210 is comprised of a plurality of different portions, which are attached to one another via fasteners 716 (e.g., screws) to facilitate ease in forming the threading 710 as part of the socket 210.

Figure 8:
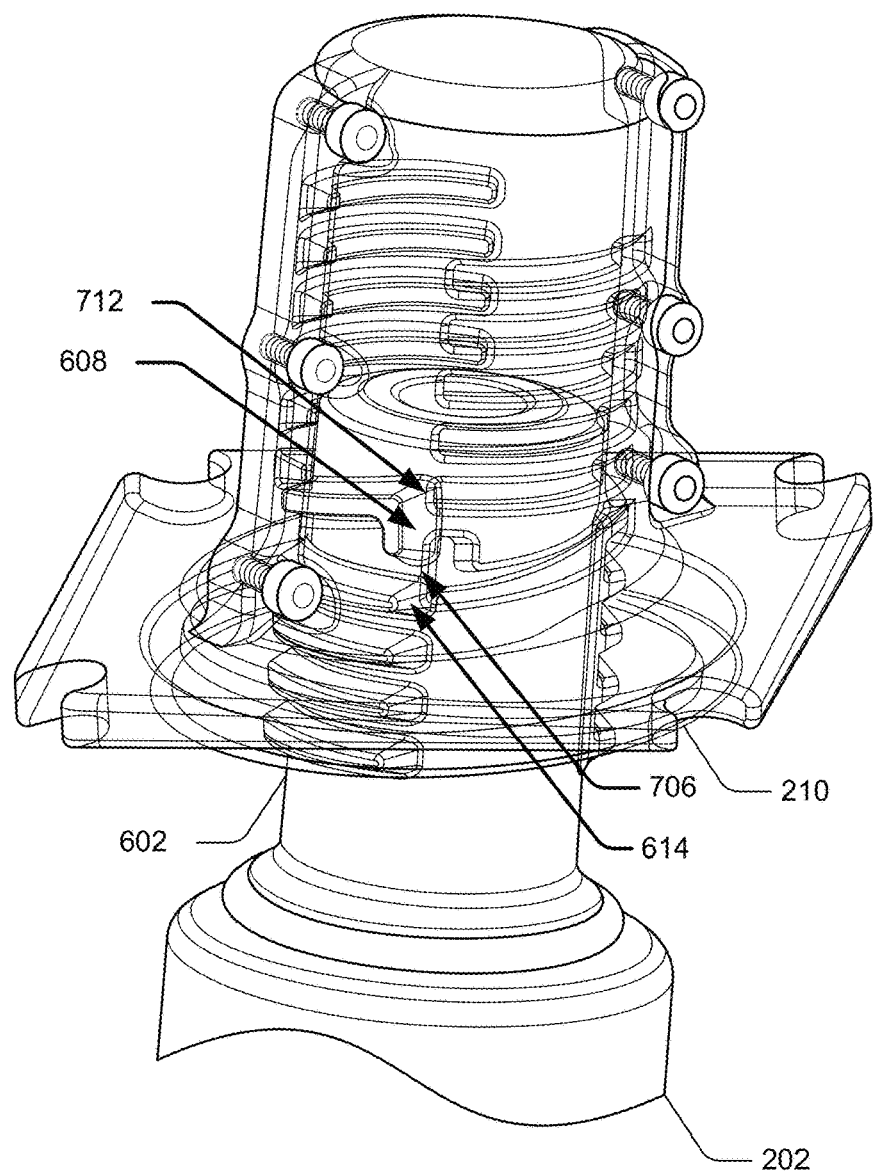
FIG. 8 depicts an element of the elevation system during aligned insertion into a socket of the portable cutting apparatus.

FIG. 8 depicts an example 800 of an element of the elevation system during aligned insertion into a socket of the portable cutting apparatus.

The illustrated example 800 depicts the protrusion 602 of a leg of the elevation system 202 as partially inserted into the socket 210 of the portable cutting apparatus. In the illustrated example 800, the front mesh guard 608 of the protrusion's alignment element 604 prevents premature meshing of the teeth 610 and the teeth 708 by preventing rotation of the protrusion 602, during aligned insertion, until fully inserted into the socket 210. For instance, during aligned insertion of the protrusion 602 into the socket 210, the front mesh guard 608 prevents meshing by contacting a leading edge 712 of the alignment element 702 or one or more teeth 708 of the socket's threading 710.

Similarly, the front mesh guard 706 of the socket's alignment element 702 prevents premature meshing of the teeth 708 and the teeth 610 by preventing rotation of the protrusion 602, during aligned insertion, until the protrusion 602 is fully inserted into the socket 210. For instance, during aligned insertion of the protrusion 602 into the socket 210, the front mesh guard 706 prevents meshing by contacting a leading edge 614 of the alignment element 604 or one or more teeth 610 of the protrusion's threading 612. Achieving alignment of the protrusion 602 relative to the socket 210 is described in further detail below with respect to FIGS. 11A-11C.

Figure 9:
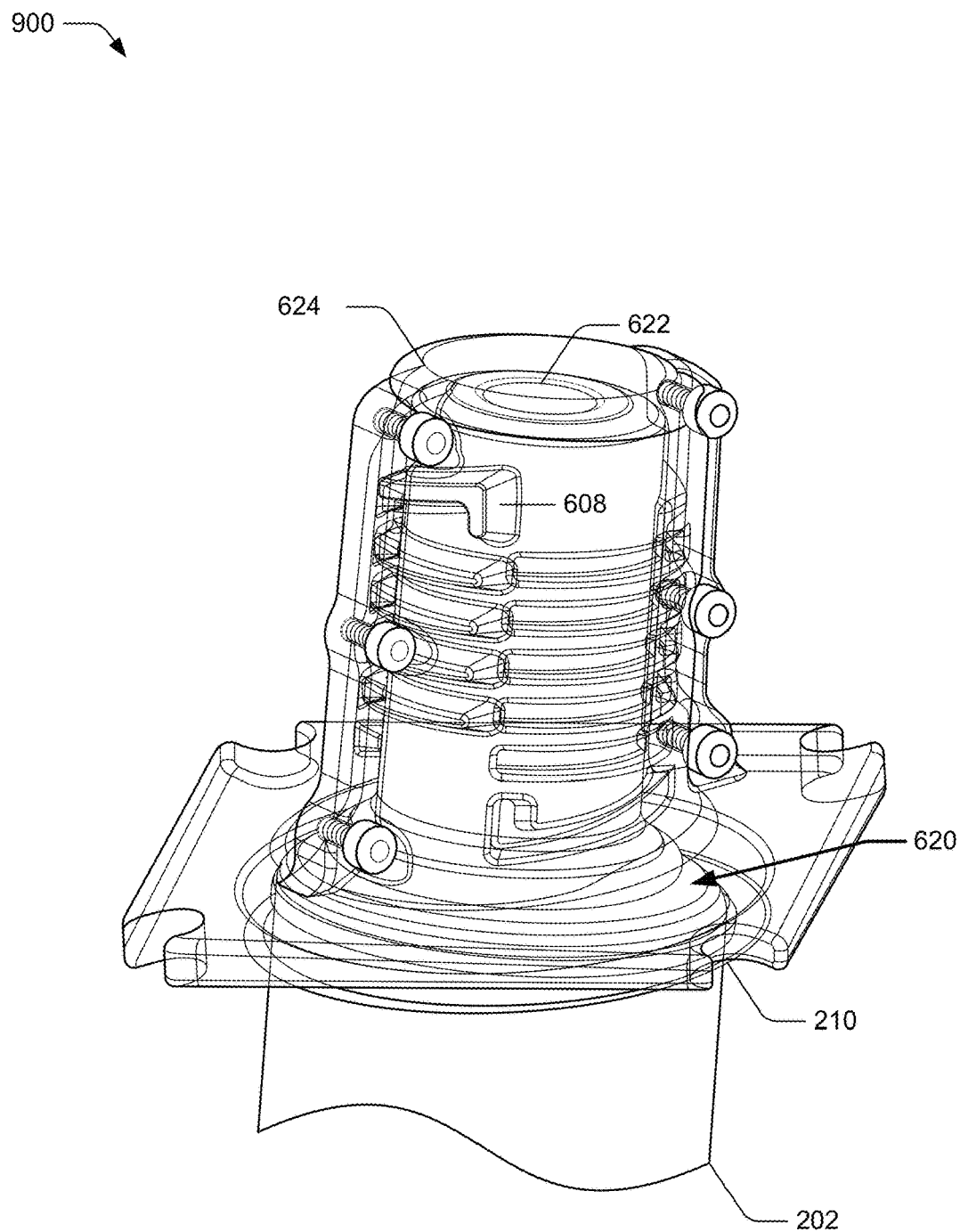
FIG. 9 depicts an element of the elevation system fully inserted into a socket of the portable cutting apparatus prior to meshing with the socket.

FIG. 9 depicts an example 900 of an element of the elevation system fully inserted into a socket of the portable cutting apparatus prior to meshing with the socket.

The illustrated example 900 depicts the protrusion 602 of the leg of the elevation system 202 as aligned with, and fully inserted into, the socket 210. The protrusion 602 is considered to be "fully inserted" into the socket 210 when the front mesh guard 608 clears a deepest one of the teeth 708 (e.g., a tooth disposed closest to the ceiling 624 of the socket 210), such that the protrusion 602 is able to rotate and mesh the teeth 610 of the protrusion 602 with the teeth 708 of the socket 210. Alternatively or additionally, the protrusion 602 is considered to be fully inserted into the socket 210 when the seal ring 620 of the protrusion 602 contacts the socket 210. Alternatively or additionally, the protrusion 602 is configured to be fully inserted into the socket 210 when the tip 622 of the socket achieves a minimum distance relative to the ceiling 624 of the socket 210 (e.g., when the tip 622 contacts the ceiling 624).

Figure 10:
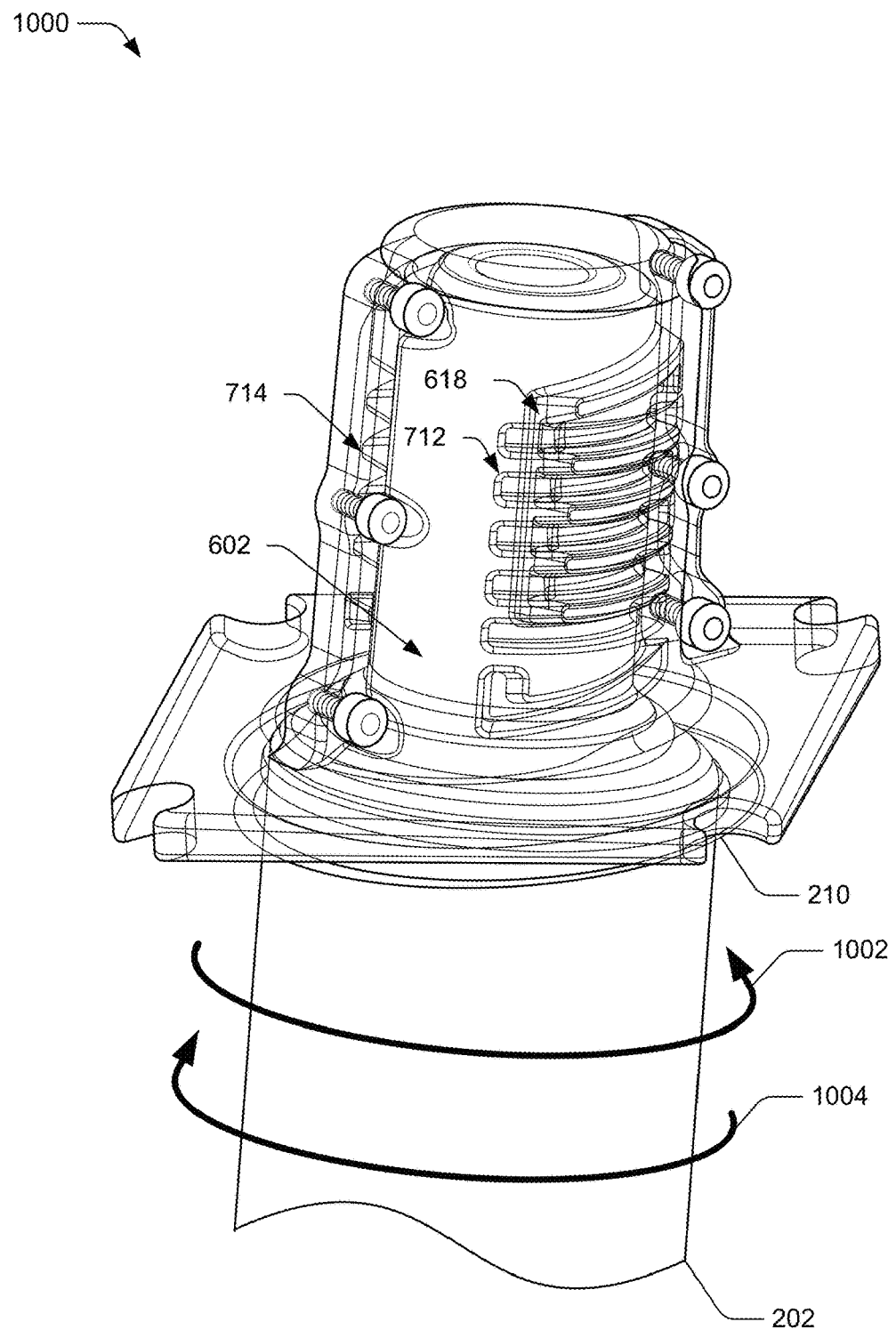
FIG. 10 depicts an element of the elevation system meshed with a socket of the portable cutting apparatus.

FIG. 10 depicts an example 1000 of an element of the elevation system meshed with a socket of the portable cutting apparatus.

The illustrated example 1000 depicts the protrusion 602 of the leg of the elevation system 202 as fully inserted into, and meshed with, the socket 210. To mesh the protrusion 602 with 210, the leg of the elevation system 202 is rotated in the direction indicated by arrow 1002 from the configuration depicted by the illustrated example 900 until further rotation in the direction indicated by the arrow 1002 is prevented by the rear mesh guard 618.

The illustrated example 1000 depicts an example implementation where rotation of the protrusion 602 in the direction of the arrow 1002 is configured to position the rear mesh guard 618 beyond a leading edge 712 of the alignment element 702. For instance, the illustrated example 1000 depicts an example implementation where the teeth 708 of the alignment element 702 extend away from an interior wall of the socket 210 at varying degrees along a length of the threading 710, such that the teeth 708 extend from a surface of the socket wall from a lesser "height" at the leading edge 712 to a greater "height" at the trailing edge 714.

The respective heights, of the teeth 708 relative to an interior surface of the socket 210, and of the rear mesh guard 618 relative to a surface of the protrusion 602, thus define a maximum point of rotation in the direction of the arrow 1002 for meshing the protrusion 602 with the socket 210. For example, in some implementations the rear mesh guard 618 is configured to extend from a surface of the protrusion 602 to a distance that exceeds a clearance between a leading edge 712 of the teeth 708 and the surface of the protrusion 602 when the protrusion 602 is fully inserted into the socket 210. In such an implementation, the configuration prevents the rear mesh guard 618 from crossing the leading edge 712 of the teeth 708 when rotated from the orientation depicted in the illustrated example 900 in the direction indicated by the arrow 1002.

In a similar manner, the rear mesh guard 618 prevents re-meshing of the threading 612 (e.g., meshing of the threading 612 with a different one of the threadings 710 included in socket 210) during removal of the protrusion 602 from the socket 210. For instance, when the protrusion 602 is rotated from the orientation depicted in the illustrated example 1000 in the direction indicated by arrow 1004, the rear mesh guard 618 is configured to prevent further rotation in the direction indicated by the arrow 1004 by contacting the trailing edge 714 of the teeth 708. Upon contacting the trailing edge 714 of the teeth 708, the rear mesh guard 618 restricts further rotation of the protrusion 602 in the direction indicated by the arrow 1004 and achieves the orientation indicated by the illustrated example 900, permitting removal of the leg of the elevation system 202 from the socket 210.

Figure 11A:
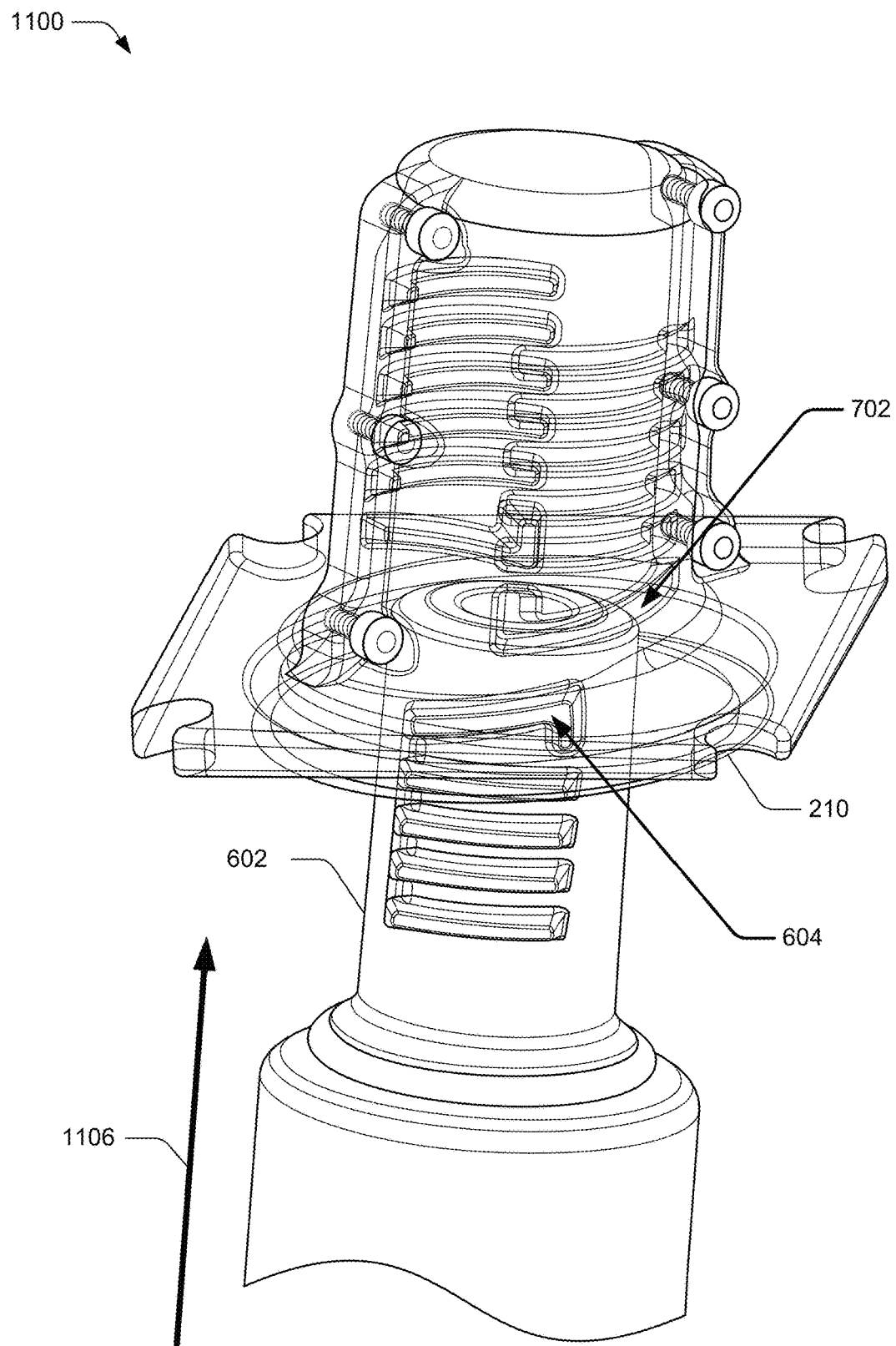
FIG. 11A depicts an element of the elevation system during unaligned insertion into a socket of the portable cutting apparatus.
Figure 11B:
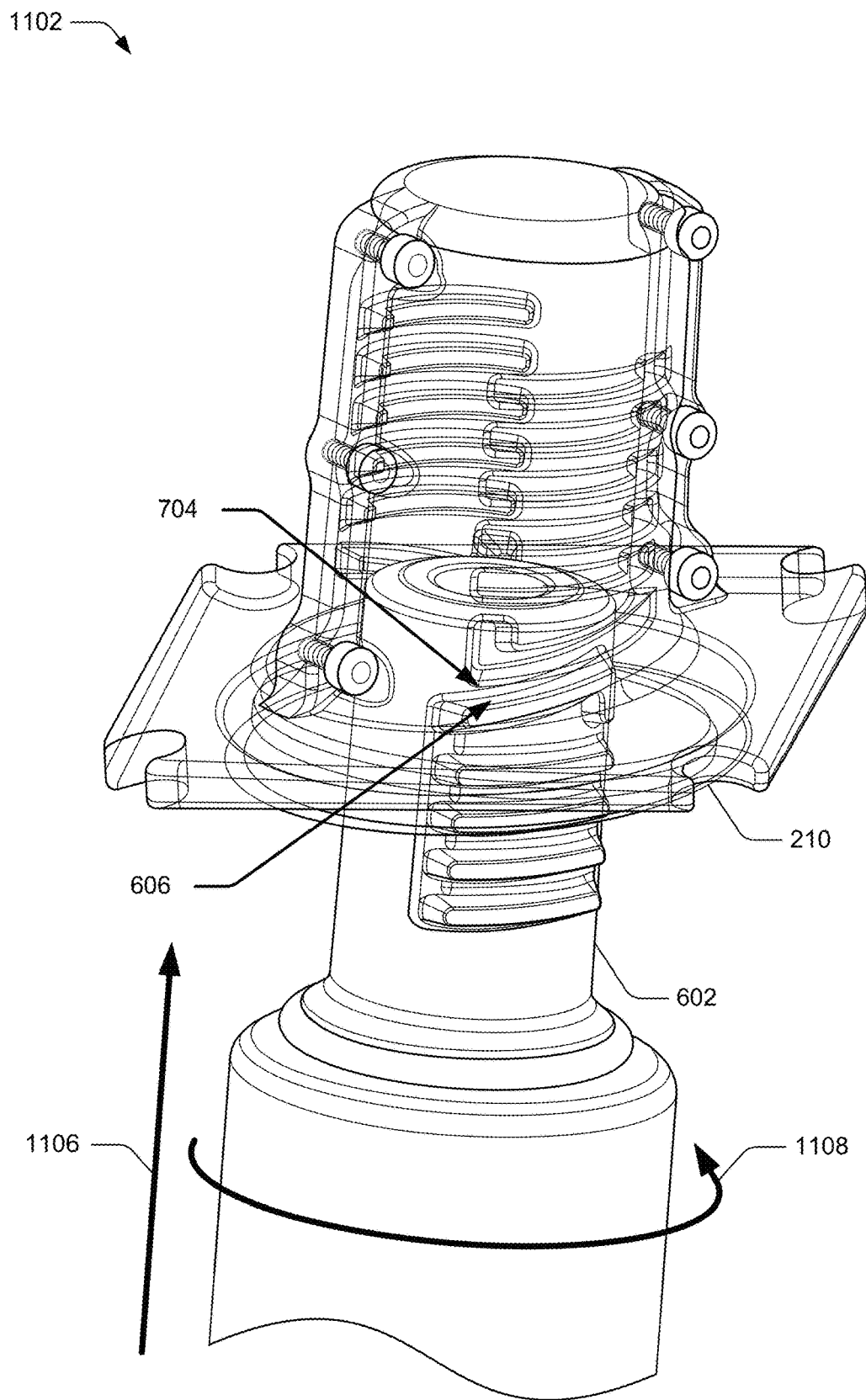
FIG. 11B depicts an alignment component of an element of the elevation system biasing the element towards alignment with a socket of the portable cutting apparatus during unaligned insertion into the socket of the portable cutting apparatus.
Figure 11C:
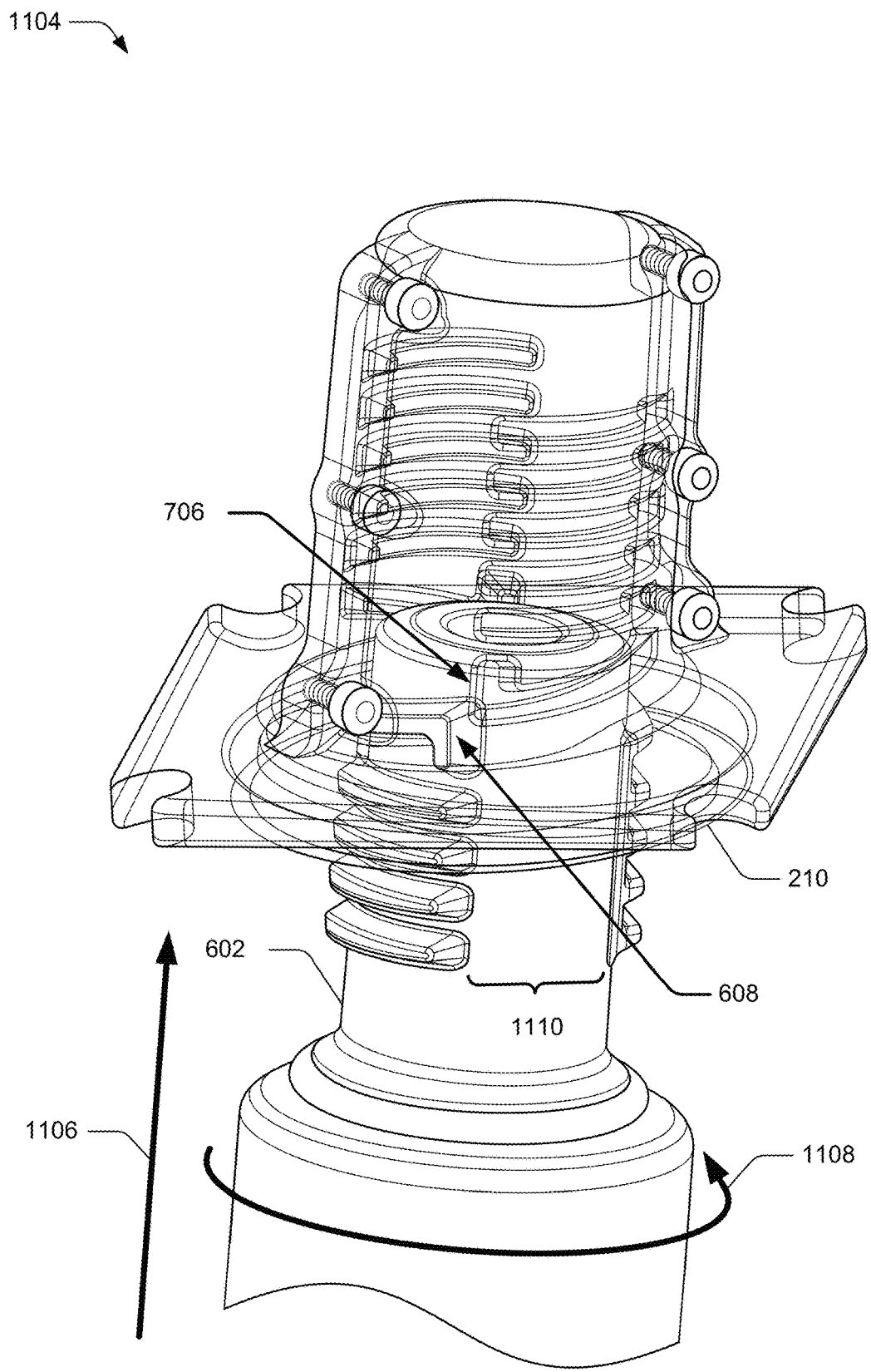
FIG. 11C depicts an element of the elevation system aligned for insertion into a socket of the portable cutting apparatus.

FIG. 11A depicts an example 1100 of an element of the elevation system during unaligned insertion into a socket of the portable cutting apparatus. FIG. 11B depicts an example 1102 of an alignment component of an element of the elevation system biasing the element towards alignment with a socket of the portable cutting apparatus during unaligned insertion into the socket of the portable cutting apparatus. FIG. 11C depicts an example 1104 of an element of the elevation system aligned for insertion into a socket of the portable cutting apparatus.

The illustrated example 1100 depicts the protrusion 602 of a leg of the elevation system 202 during insertion of the protrusion 602 into the socket 210 (e.g., in a direction indicated by arrow 1106) when the protrusion 602 is not aligned for full insertion into the socket 210. As described herein, the protrusion 602 is "not aligned," "misaligned," or "unaligned" for full insertion into the socket 210 when the alignment element 604 contacts the alignment element 702 during insertion of the protrusion 602 into the socket 210 generally in the direction indicated by the arrow 1106.

The illustrated example 1102 depicts the protrusion 602 as being inserted further (relative to the illustrated example 1100) into the socket 210. In the illustrated example 1102, the protrusion 602 is inserted into the socket 210 to a point where the ramp surface 704 of the alignment element 702 contacts the ramp surface 606 of the alignment element 604. The ramp surface 704 and the ramp surface 606 are configured to glide along one another to bias rotation of the protrusion 602 in the direction indicated by arrow 1108.

Thus, the ramp surface 704 and the ramp surface 606 are configured to transfer force applied to the protrusion 602 generally in the direction indicated by the arrow 1106 (e.g., during insertion of the protrusion 602 into the socket 210) to the direction indicated by the arrow 1108. In this manner, the alignment elements 604 and 702 are configured to guide the protrusion 602 of the leg of the elevation system 202 into alignment with the socket 210, mitigating the need for a user of the portable cutting apparatus to ensure that the leg of the elevation system 202 is rotationally aligned with the socket 210 prior to insertion of the protrusion 602. The ramp surface 606 and the ramp surface 704 are configured to guide rotation of the protrusion 602 until proper alignment is achieved for fully inserting the protrusion 602 into the socket 210, as depicted by the illustrated example 1104.

In the illustrated example 1104, the protrusion 602 is depicted as having been rotated in the direction indicated by the arrow 1108 from the orientation depicted by the illustrated example 1102 until a gap 1110 between alignment elements 604 of the protrusion 602 is positioned such that inserting the protrusion 602 into the socket 210 in the direction generally indicated by the arrow 1106 does not cause the ramp surface 606 and the ramp surface 704 to contact one another. In some implementations, the ramp surface 606 and the ramp surface 704 are configured to bias rotation of the protrusion 602 in the direction indicated by the arrow 1108 until the front mesh guard 608 contacts the front mesh guard 706. In such an implementation, gliding the ramp surface 606 along the ramp surface 704 until rotation in the direction of the arrow 1108 until the front mesh guard 608 contacts the front mesh guard 706 provides tactile feedback to a user of the portable cutting apparatus that the protrusion 602 is properly aligned with the socket 210 for full insertion and meshing. Complete insertion of the protrusion 602 into the socket 210 can then be achieved by continuing to insert the protrusion 602 from the position indicated by the illustrated example 1104 along the direction indicated by the arrow 1106 until achieving the position indicated by the illustrated example 900 of FIG. 9. After fully inserting and meshing each of the one or more legs elevation system 202 into respective sockets 210 of the portable cutting apparatus, the cutting board 102 is fully deployed and configured for use in an elevated configuration.

Although described herein as being used to mechanically secure a leg of the elevation system 202 to the portable cutting apparatus, these examples do not exhaustively describe possible implementations for the socket 210 and the protrusion 602. Rather, the socket 210 is configured to secure any component outfitted with the protrusion 602 to the portable cutting apparatus. Further, although the respective threadings of the protrusion 602 and the socket 210 are described as being incorporated as part of a portable cutting apparatus, the protrusion 602 and socket 210 are useable in a variety of additional applications, such as for securing furniture (e.g., chairs, stools, etc.) components, securing tent poles, and so forth.

In addition to being configured for easy deployment and removal from the sockets 210 of the portable cutting apparatus, the legs of the elevation system 202 are further configured for leveling the cutting surface 112 and preventing the portable cutting apparatus from sliding on a variety of surfaces when the elevation system 202 is deployed.

Figure 12:
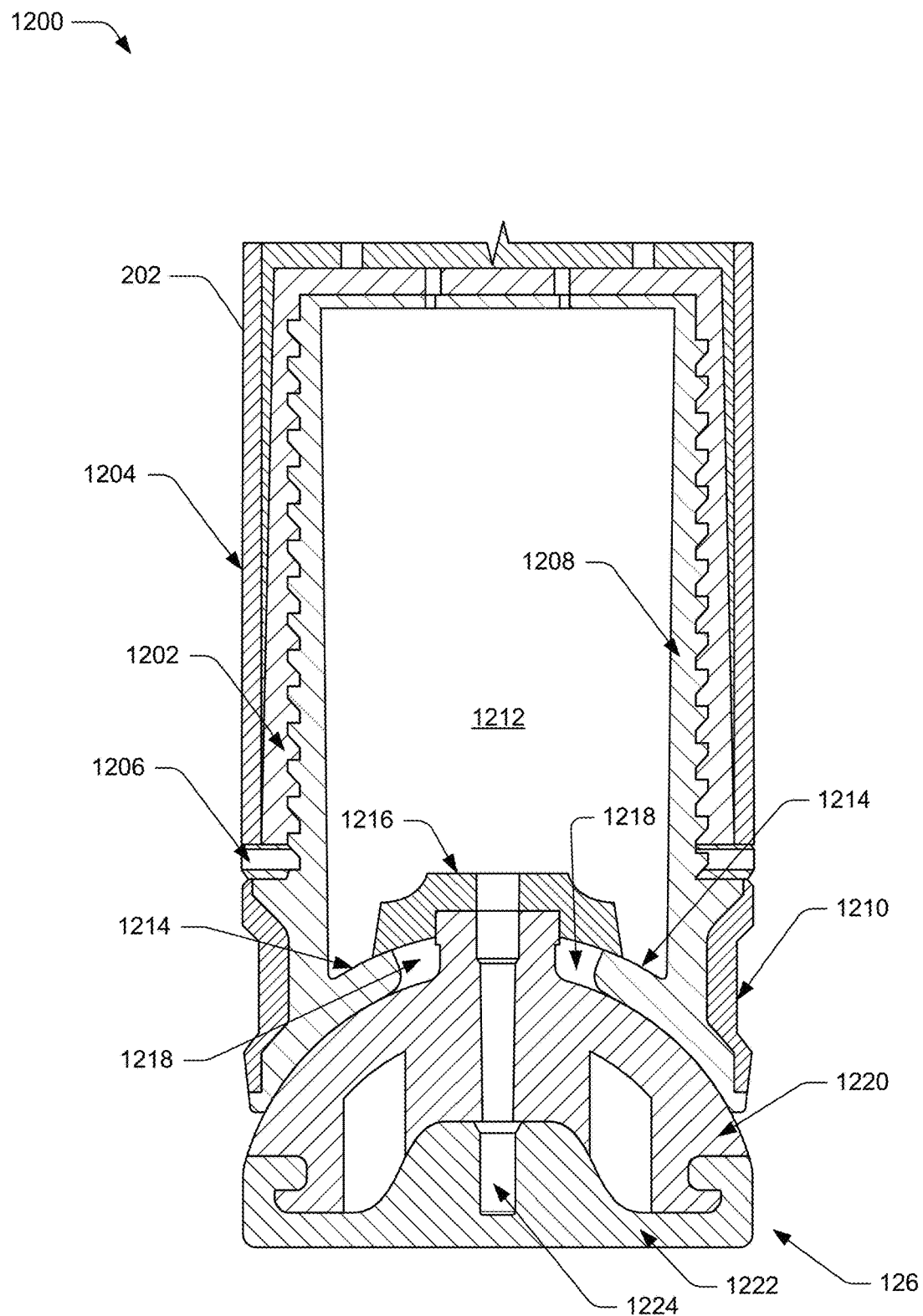
FIG. 12 depicts a cutaway view of a foot for an elevation system of the portable cutting apparatus positioned in a retracted and level orientation.

FIG. 12 depicts an example 1200 of a cutaway view of a foot for an elevation system of the portable cutting apparatus positioned in a retracted and level orientation. The illustrated example 1200 includes a cutaway view of a table foot 126 attached to a leg of the elevation system 202. To attach the table foot 126 to the leg of the elevation system 202, the leg is constructed to include an internal threading 1202 disposed within an exterior housing 1204. In some implementations, the internal threading 1202 and the exterior housing 1204 are formed from a single piece of material (e.g., metal, plastic, etc.), such that the internal threading 1202 is machined from the exterior housing 1204.

Alternatively, the internal threading 1202 and the exterior housing 1204 may be formed from separate materials, such that the internal threading 1202 is inserted into and attached to the exterior housing 1204 of the leg of the elevation system 202. In implementations where the internal threading 1202 and the exterior housing 1204 are formed from separate materials, the internal threading 1202 may be secured within the exterior housing 1204 via an endcap 1206. The endcap 1206 may be removably secured to the leg of the elevation system 202 to enable removal and replacement of the internal threading 1202 or may be permanently affixed to the leg of the elevation system 202. Alternatively or additionally, in implementations where the internal threading 1202 and the exterior housing 1204 are formed from a single piece of material, the endcap 1206 may similarly represent a portion of the single piece of material.

The thread of the internal threading 1202 is representative of a female thread configured to receive a male thread of a foot threading 1208 for the table foot 126. As described in further detail below with respect to FIG. 13, the internal threading 1202 and the foot threading 1208 are configured to enable adjustment of a distance between a base of the table foot 126 and the endcap 1206. To enable adjustment of the distance between the based on the table foot 126 and the endcap 1206, the table foot is configured to include an adjustment grip 1210. The adjustment grip 1210 is configured to be gripped by a hand of a user of the portable cutting apparatus and rotated to screw or unscrew the foot threading 1208 relative to the internal threading 1202. In some implementations, the foot threading 1208 is formed from a first material (e.g., plastic) and the adjustment grip 1210 is formed from a second material (e.g., rubber) to facilitate easy grip and adjustment of the table foot 126 relative to the leg of the elevation system 202. Alternatively, in some implementations the foot threading 1208 is formed from a same material as the adjustment grip 1210.

The table foot 126 is fabricated to include a cavity 1212 disposed within the foot threading 1208, where the cavity is constrained by sidewalls of the foot threading 1208 opposite the male threads and a cavity floor 1214. The cavity floor 1214 is configured to extend inward from an exterior toward a center of the table foot 126, leaving a gap 1218 at the center of the table foot 126. The gap 1218 is configured to enable movement of a foot cap 1216 within the cavity 1212 and enable adjustment of an angle at which the table foot 126 is oriented.

The foot cap 1216 is connected to a ball 1220 and a base 1222 of the table foot 126 via a fastener 1224 (e.g., a screw). In this manner, the ball 1220 is configured to articulate about a socket formed by a surface opposite the cavity floor 1214. A range of motion by which the ball 1220 may articulate about the socket formed by the surface opposite the cavity floor 1214 is thus constrained by respective dimensions of the cavity 1212, the foot cap 1216, and the gap 1218, and is not limited by the illustrated example 1300. In accordance with one or more implementations, to enable ease of articulation about the socket formed by the surface opposite the cavity floor 1214, the surface opposite the cavity floor 1214 and the ball 1220 may be formed from low-friction, long-wearing materials (e.g., nylon). The base 1222 of the table foot 126 may be formed of, for instance, a durable material (e.g., vulcanized rubber) configured to prevent the portable cutting apparatus from sliding on a surface (e.g., a tailgate of a truck, a surface of a boat, a kitchen counter, and so forth).

Although described herein in the context of various example materials, components of the elevation system 202 may be formed from other materials without departing from the spirit or scope of the techniques described herein.

Figure 13:
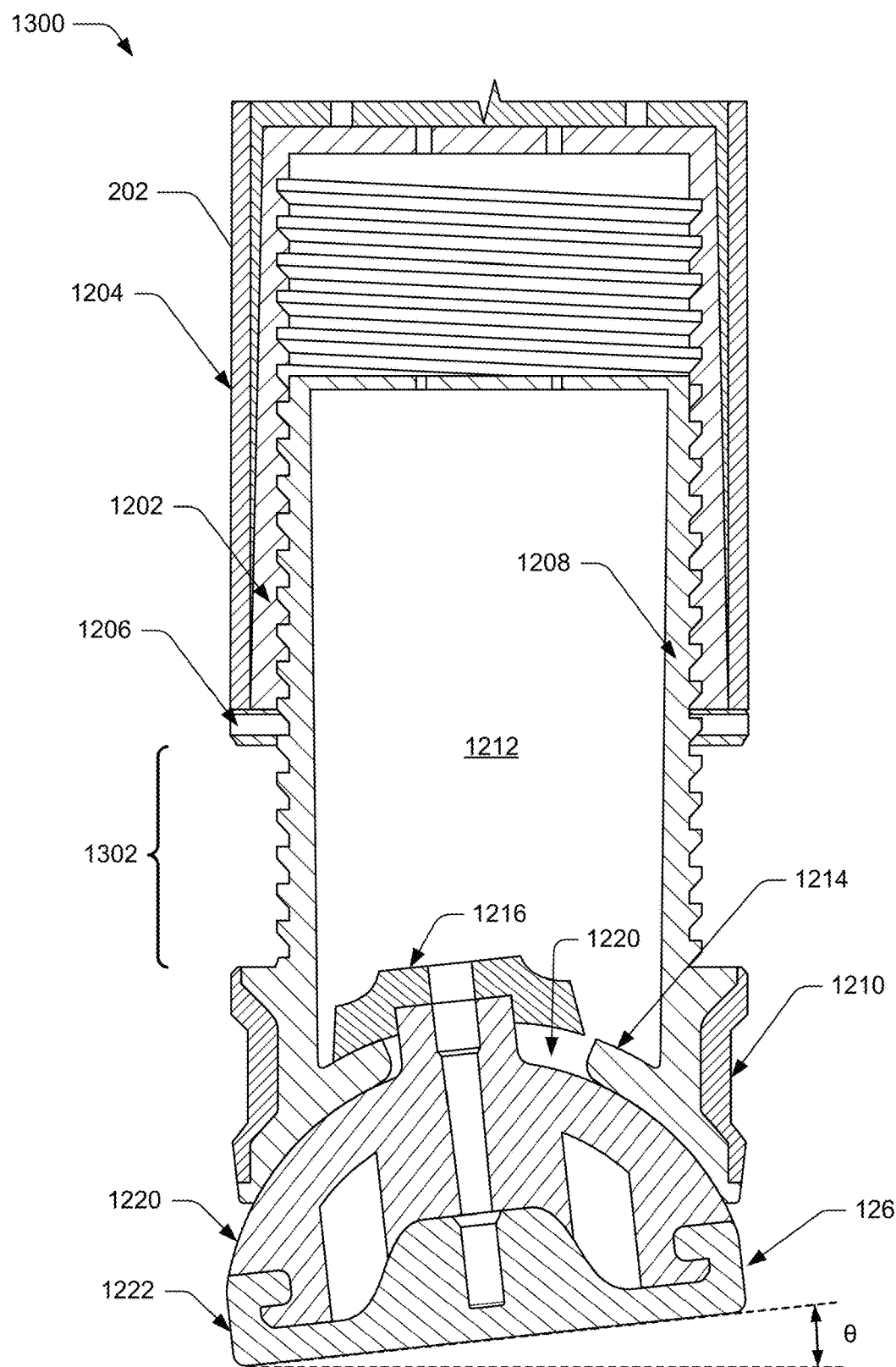
FIG. 13 depicts a cutaway view of a foot for an elevation system of the portable cutting apparatus positioned in an extended and angled orientation.

FIG. 13 depicts an example 1300 of a cutaway view of a foot for an elevation system of the portable cutting apparatus positioned in an extended and angled orientation. The illustrated example 1300 includes a cutaway view of a table foot 126 attached to a leg of the elevation system 202. Relative to the orientation depicted in the illustrated example 1200, the table foot 126 is extended away from the endcap 1206 of the leg of the elevation system 202 by a distance 1302 and tilted at an angle θ. In this manner, the table foot 126 is configured to be adjusted such that a plane defined by the base 1222 can be oriented differently from a plane defined by the cutting surface 112 of the cutting board 102, thereby enabling the portable cutting apparatus to adapt to a variety of surfaces and terrains while providing a level cutting surface.

To adjust the distance 1302 at which the table foot 126 is positioned from the endcap 1206, a user of the portable cutting apparatus can twist the adjustment grip 1210 relative to the exterior housing 1204 of the leg of the elevation system 202. Twisting the adjustment grip 1210 while the leg of the elevation system 202 is restricted from rotating (e.g., by mechanically securing the elevation system 202 within a socket of the portable cutting apparatus as described above with respect to FIGS. 6-11C, by the user gripping the exterior housing 1204, and so forth) causes the foot threading 1208 to rotate within the internal threading 1202 and translate the twisting force into linear movement of the table foot 126 relative to the endcap 1206. The direction of the linear movement of the table foot 126 relative to the endcap 1206 caused by twisting of the adjustment grip 1210 depends on a direction of the twisting as well as a thread direction for the internal threading 1202 and the foot threading 1208.

For instance, configuring the internal threading 1202 and the foot threading 1208 with a right-handed thread and twisting the adjustment grip 1210 in a first direction about the leg of the elevation system 202 might cause the distance 1302 to increase while configuring the internal threading 1202 and the foot threading 1208 with a left-handed thread and twisting the adjustment grip 1210 in the first direction would cause the distance 1302 to decrease. A thread direction as well as a thread size, a thread form, a thread angle, a thread pitch, a thread depth, and other aspects of the internal threading 1202 and the foot threading 1208 are configurable in any variety of manners, and are not limited by the illustrated examples described herein. An amount of distance 1302 by which the table foot 126 may travel relative to the endcap 1206 is limited only by a depth of the internal threading 1202 relative to, and a length of, the leg of the elevation system 202. In some implementations, the internal threading 1202 may extend an entire length of the leg of the elevation system 202.

The table foot 126 is configured to be tilted at an angle θ relative to the "level" orientation depicted in the illustrated example 1200 by articulating the foot cap 1216 within the cavity 1212 and the ball 1220 about the socket formed opposite the cavity floor 1214. In accordance with one or more implementations, the table foot 126 is configured to automatically adjust (e.g., without manual user manipulation of the table foot 126) to the angle θ to accommodate for a surface upon which the portable cutting apparatus is positioned based on force applied to the portable cutting apparatus (e.g., gravity, a load placed upon the cutting surface 112, and so forth). Alternatively or additionally, the table foot 126 may be restricted from freely articulating (e.g., via friction between the ball 1220 and the socket formed by the surface opposite the cavity floor 1214) absent a user of the portable cutting apparatus physically adjusting the angle θ (e.g., by physically gripping the ball 1220 and/or the base 1222 and tilting the table foot 126) relative to the leg of the elevation system 202.

In this manner, the elevation system 202 is configured to include a table foot 126 that is adjustable to achieve a different distance 1302 from the endcap 1206 of the table leg and a different angle θ, relative to a table foot 126 of a different leg of the elevation system 202. The elevation system 202 thus enables orienting the portable cutting apparatus to achieve a level and stationary cutting surface 112, even when deployed on uneven and slippery surfaces.

Having discussed exemplary details of the portable cutting apparatus elevation system, consider now some examples of procedures to illustrate additional aspects for deployment of the elevation system.

Example Portable Cutting Apparatus Procedures

This section describes examples of procedures for the portable cutting apparatus elevation system. The procedures are shown as a set of blocks that specify operations performed and are not necessarily limited to the orders shown for performing the operations by the respective blocks.

FIG. 14 depicts a procedure 1400 in an example implementation in which an elevation system for a portable cutting apparatus is deployed by forming a socket in the portable cutting apparatus, forming a leg of the elevation system, and meshing the leg of the elevation system with the socket.

A cutting board is formed to include a cutting surface and a bottom surface that includes side walls disposed along opposite edges of the bottom surface (block 1402). By way of example, cutting board 102 is formed to include cutting surface 112 and bottom surface 114. The cutting board 102 is formed so that the bottom surface 114 includes side walls 116. The side walls 116 are disposed along opposite edges of the bottom surface 114 of the cutting board 102, such that a channel 118 is formed between the side walls 116, separating the side walls 116.

A socket is formed in the bottom surface that is configured to receive a leg of an elevation system for the cutting board by threading the socket to include an alignment element and at least one tooth (block 1404). By way of example, a socket 210 may be formed as a cavity in the bottom surface 114, and optionally as part of a reinforcement plates 104 for the cutting board 102. The socket 210 is threaded to include at least one threading 710, where each threading 710 includes an alignment element 702 and one or more teeth 708. The alignment element 702 includes a ramp surface 704 that is configured to rotationally bias a leg of the elevation system 202 towards alignment for full insertion during insertion of a protrusion 602 of the leg into the socket 210. The front mesh guard 706 is configured to prevent the teeth 708 from meshing with the teeth 610 prior to full insertion of the protrusion 602 into the socket 210.

A leg of the elevation system is formed (block 1406). To form the leg of the elevation system 202, a protrusion of the leg is threaded with an alignment element and at least one tooth, where the alignment element of the protrusion is configured to glide along the alignment element of the socket and the at least one tooth of the protrusion is configured to mesh with the at least one tooth of the socket (block 1408). By way of example, a protrusion 602 may be formed as part of a leg of the elevation system 202. The protrusion 602 is threaded to include at least one threading 612, where each threading 612 includes an alignment element 604 and one or more teeth 610. The alignment element 604 includes a ramp surface 606 configured to glide along the ramp surface 704 of the socket 210 during insertion of the protrusion 602 into the socket 210 until the protrusion 602 is aligned for full insertion into the socket 210. The front mesh guard 608 is configured to prevent the teeth 610 from meshing with the teeth 708 prior to full insertion of the protrusion 602 into the socket 210.

In some implementations, forming the leg of the elevation system 202 further includes threading a cavity of the leg opposite the protrusion to receive a table foot for the elevation system (block 1410). By way of example, a cavity is formed within an exterior housing 1204 of the leg of the elevation system 202 opposite the protrusion 602 and threaded with an internal threading 1202 to receive a table foot 126. The internal threading 1202 is configured as a female threading for a counterpart male threading of the table foot 126, such as the foot threading 1208. The internal threading 1202 and the foot threading 1208 are configured to enable adjustment of the height of the elevation system 202 leg by rotating the table foot 126 to change a distance between a base 1222 of the table foot 126 and an endcap 1206 of the leg of the elevation system 202.

The elevation system is deployed by meshing the at least one tooth of the leg with the at least one tooth of the socket (block 1412). By way of example, the protrusion 602 of the leg of the elevation system 202 is inserted into the socket 210 along a direction indicated by the arrow 1106 until a fully inserted position is achieved, such as the fully inserted position indicated by the illustrated example 900. The protrusion 602 is then rotated within the socket 210 in the direction indicated by arrow 1002 until a rear mesh guard 618 of the protrusion's threading 612 prevents further rotation in the direction indicated by the arrow 1002, at which point the leg of the elevation system 202 is fully deployed. Operation of block 1412 is repeated for each of a plurality of legs of the elevation system 202 until each of the plurality of legs have been deployed, at which point the elevation system 202 for the portable cutting apparatus is fully deployed.

CONCLUSION

Although aspects of a portable cutting apparatus have been described in language specific to structural features and/or methods, it is to be understood that the appended claims are not necessarily limited to the specific features or methods described. Rather, the specific features and methods are disclosed as example implementations of a portable cutting apparatus. Further, various different examples are described, and it is to be appreciated that each described example can be implemented independently or in connection with one or more other described examples.

What is claimed is:

1. A portable cutting apparatus comprising:
a cutting board comprising a cutting surface and a bottom surface, the bottom surface comprising side walls disposed along opposite edges of the bottom surface; and
a first reinforcement plate attached to the side walls at a first end of the bottom surface of the cutting board and a second reinforcement plate attached to the side walls at a second end of the bottom surface of the cutting board, the first and second reinforcement plates each including at least one socket threaded with an alignment component and one or more teeth, each of the alignment components configured to bias rotation of an elevation system leg during insertion into each of the at least one sockets and each of the one or more teeth configured to mesh with at least one tooth of the elevation system leg for securing the elevation system leg within each of the at least one sockets.

2. The portable cutting apparatus of claim 1, wherein each of the alignment components includes a ramp surface configured to bias the rotation of the elevation system leg by gliding along a surface of a corresponding alignment component disposed on the elevation system leg.

3. The portable cutting apparatus of claim 1, wherein each of the alignment components includes a mesh guard that prevents each of the one or more teeth from meshing with the at least one tooth of the elevation system leg until the elevation system leg is fully inserted into each of the at least one sockets.

4. The portable cutting apparatus of claim 1, wherein each of the one or more teeth are dimensioned to extend away from an interior surface of each of the at least one sockets at a first height at a leading edge of each of the one or more teeth and at a second height at a trailing edge of each of the one or more teeth, the second height being greater than the first height.

5. The portable cutting apparatus of claim 4, wherein the first height and the second height are dimensioned to restrict rotational movement of the elevation system leg past a designated position when each of the one or more teeth of each of the at least one sockets are meshed with the at least one tooth of the elevation system leg.

6. The portable cutting apparatus of claim 4, wherein the second height is dimensioned to prevent re-meshing of the elevation system leg with each of the at least one sockets during rotation of the elevation system leg to remove the elevation system leg from each of the at least one sockets.

7. The portable cutting apparatus of claim 1, wherein each of the at least one sockets comprises a plurality of sockets and the elevation system comprises a plurality of legs, each of the sockets of the plurality of sockets configured to receive one of the plurality of legs of the elevation system to elevate the portable cutting apparatus in an elevated state.

8. The portable cutting apparatus of claim 1, wherein the elevation system leg includes a seal ring configured to prevent debris from entering each of the at least one sockets when the elevation system leg is fully inserted into each of the at least one sockets.

9. The portable cutting apparatus of claim 1, wherein each of the at least one sockets includes a ceiling that defines a depth at which each of the at least one sockets extends from the bottom surface towards the cutting surface and the elevation system leg includes a tip that is configured to contact the ceiling when the elevation system leg is fully inserted into each of the at least one sockets.

10. The portable cutting apparatus of claim 1, further comprising a storage cavity formed by attaching the first and second reinforcement plates to the side walls, the storage cavity configured to store the elevation system leg.

11. The portable cutting apparatus of claim 1, wherein the elevation system leg includes a foot configured to enable adjustment of a length of the elevation system leg to a plurality of different lengths.

12. The portable cutting apparatus of claim 11, wherein the foot is configured to articulate within a socket formed by an end of the elevation system leg to dispose a plane defined by a base of the foot at different angles relative to a plane defined by the cutting surface.

\* \* \* \* \*